US011924667B2

(12) United States Patent
Tamura et al.

(10) Patent No.: US 11,924,667 B2
(45) Date of Patent: *Mar. 5, 2024

(54) WIRELESS COMMUNICATION TERMINAL, WIRELESS COMMUNICATION BASE STATION, WIRELESS COMMUNICATION SYSTEM, AND REPORTING METHOD

(71) Applicant: Sun Patent Trust, New York, NY (US)

(72) Inventors: Takashi Tamura, Kanagawa (JP); Takahisa Aoyama, Kyoto (JP); Hidenori Matsuo, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,173

(22) Filed: Nov. 2, 2022

(65) Prior Publication Data

US 2023/0300656 A1    Sep. 21, 2023

Related U.S. Application Data

(63) Continuation of application No. 17/200,343, filed on Mar. 12, 2021, now Pat. No. 11,540,161, which is a
(Continued)

(30) Foreign Application Priority Data

Feb. 15, 2011   (JP) .................................. 2011-030036
Apr. 1, 2011    (JP) .................................. 2011-082183

(51) Int. Cl.
*H04W 24/10*    (2009.01)
*H04L 43/0823*  (2022.01)
*H04W 76/19*    (2018.01)

(52) U.S. Cl.
CPC ......... *H04W 24/10* (2013.01); *H04L 43/0823* (2013.01); *H04W 76/19* (2018.02); *Y02B 70/30* (2013.01); *Y02D 30/70* (2020.08)

(58) Field of Classification Search
CPC ... H04W 24/10; H04W 24/02; H04W 76/028; H04W 76/048; H04W 76/046;
(Continued)

(56) References Cited

U.S. PATENT DOCUMENTS 9,319,917 B2    4/2016  Tamura et al.
2007/0287501 A1* 12/2007  Hoshina .............. H04W 52/367
                                                      455/562.1
(Continued)

FOREIGN PATENT DOCUMENTS

EP          2180731 A1      4/2010
JP          5809647 B2     11/2015
WO      WO 2011005537 A2    1/2011

OTHER PUBLICATIONS

3GPP TS 36.300 V10.2.0 Technical Specification; 3rd Generation Partnership Project; Technical Specification Group Radio Access Network; Evolved Universal Terrestrial Radio Access (E-UTRA) and Evolved Universal Terrestrial Radio Access Network (E- Utran); Overall description (Release 10); Dec. 2010, 200 pages.
(Continued)

*Primary Examiner* — Un C Cho
*Assistant Examiner* — Rasha K Fayed
(74) *Attorney, Agent, or Firm* — Seed IP Law Group LLP

(57) ABSTRACT

In a wireless communication terminal in a wireless communication system for performing a control not to transmit signals, or to transmit signals with a reduction in a transmission power by a part of radio resources for a downlink signal in a cell provided by a base station, the terminal receives control information in generating a report related to a measurement result of the cell provided by the base station, monitors a state of a radio link with an own cell, and performs measurement on reception of the downlink signal. If an instruction for restricting the measurement to a part of the radio resources is included in the control information
(Continued)

from the base station after the radio link failure occurs, the terminal generates and transmits a radio link failure report including the measurement result in the radio resources as instructed when the radio link failure occurs.

6 Claims, 20 Drawing Sheets

Related U.S. Application Data continuation of application No. 16/576,138, filed on Sep. 19, 2019, now Pat. No. 10,986,521, which is a continuation of application No. 16/209,141, filed on Dec. 4, 2018, now Pat. No. 10,470,071, which is a continuation of application No. 15/825,013, filed on Nov. 28, 2017, now Pat. No. 10,178,577, which is a continuation of application No. 15/071,078, filed on Mar. 15, 2016, now Pat. No. 9,872,194, which is a continuation of application No. 13/984,199, filed as application No. PCT/JP2012/000496 on Jan. 26, 2012, now Pat. No. 9,319,917.

(58) Field of Classification Search
CPC ..... H04W 36/00; H04W 36/08; H04W 36/24; H04W 36/0005; H04W 36/04; H04W 36/0083; H04W 36/02; H04W 92/20; H04W 92/18; H04W 28/04; H04W 28/02; H04W 28/06; H04W 48/08; H04W 48/02; H04W 48/20; H04W 48/04; H04L 12/26; H04L 12/02; H04L 12/08

See application file for complete search history.

(56) References Cited

U.S. PATENT DOCUMENTS

| | | | | |
|---|---|---|---|---|
| 2008/0188215 | A1* | 8/2008 | Bergstrom | H04W 24/02 455/424 |
| 2009/0005060 | A1* | 1/2009 | Mazawa | H04W 28/22 455/452.2 |
| 2010/0322227 | A1 | 12/2010 | Luo | |
| 2010/0323627 | A1* | 12/2010 | Alanara | H04B 17/24 455/67.11 |
| 2011/0190016 | A1 | 8/2011 | Hamabe et al. | |
| 2011/0217985 | A1* | 9/2011 | Gorokhov | H04W 24/10 455/452.2 |
| 2011/0319025 | A1* | 12/2011 | Siomina | H04B 7/0691 455/63.1 |
| 2012/0113843 | A1 | 5/2012 | Watfa et al. | |
| 2012/0115529 | A1* | 5/2012 | Sun | H04W 24/10 455/517 |
| 2012/0213107 | A1* | 8/2012 | Jang | H04W 72/543 370/252 |
| 2012/0275322 | A1* | 11/2012 | Ji | H04W 24/10 370/252 |
| 2013/0033998 | A1* | 2/2013 | Seo | H04W 24/10 370/252 |
| 2013/0223267 | A1 | 8/2013 | Jung et al. | |
| 2013/0301531 | A1 | 11/2013 | Tao | |
| 2013/0303157 | A1 | 11/2013 | Tao | |
| 2013/0303217 | A1 | 11/2013 | Tao | |
| 2013/0315075 | A1* | 11/2013 | Tamura | H04W 24/10 370/242 |
| 2014/0086173 | A1* | 3/2014 | Sadeghi | H04W 68/02 370/328 |
| 2014/0119334 | A1* | 5/2014 | Kazmi | H04L 5/0032 370/330 |
| 2016/0198357 | A1 | 7/2016 | Tamura et al. | |

OTHER PUBLICATIONS

3GPP TS 36.331 V10.0.0 Technical Specification; 3rd Generation Partnership Project; Technical Specification Group Radio Access Network; Evolved Universal Terrestrial Radio Access (E-UTRA); Radio Resource Control (RRC); Protocol specification (Release 10); Dec. 2010, 276 pages.

3GPP TS 37.320 V10.0.0, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," Dec. 2010, 17 pages.

Alcatel-Lucent, "Signaling support for Almost Blank Subframe patterns," Agenda Item: 7.6.1.1, R2-106449, 3GPP TSG-RAN WG2 Meeting #72, Jacksonville, USA, Nov. 15-19, 2010, 5 pages.

Alcatel-Lucent, "Simultaneous use of RNTP and ABS for R10 inter-cell interference coordination," Agenda Item: 19.1, R1-103335, 3GPP TSG RAN WG3 Meeting #70, Jacksonville, USA, Nov. 15-19, 2010, 5 pages.

Alcatel-Lucent, Alcatel-Lucent Shanghai Bell, "Contents of ABS status reporting for time-domain ICIC," Agenda Item: 19, R3-110255, 3GPP TSG RAN WG3 Meeting #70bis, Dublin, Ireland, Jan. 17-21, 2011, 3 pages.

Chinese Office Action, dated Oct. 14, 2015, for Chinese Application No. 201280008291.8, 33 pages.

Email discussion rapporteur (Qualcomm Incorporated), "Email discussion [72#33] : time domain ICIC 'Pattern2' details," R2-110053, 3GPP TSG-RAN WG2 meeting #72bis, Dublin, Ireland, Jan. 17-21, 2011, 12 pages.

Ericsson, ST-Ericsson, "Considerations on non-CA based heterogeneous deployments," Agenda Item: 6.8, R1-102618, 3GPP TSG-RAN WG1 #61, Montreal, Canada, May 10-14, 2010, 3 pages.

Extended European Search Report, dated Oct. 30, 2017, for corresponding European Application No. 12746542.5 - 1857 / 2677798, 12 pages.

International Search Report, dated Mar. 6, 2012, for International Application No. PCT/JP2012/000496, 2 pages.

LG Electronics Inc., "Measuring restriction for macro-pico scenario," Agenda Item: 7.6.1.1, R2-106579, 3GPP TSG-RAN2 Meeting #72, Jacksonville, USA, Nov. 15-19, 2010, 3 pages.

LG Electronics Inc., "Use of Configured ABS Pattern after HO failure and RLF," Agenda Item: 7.5.1, R2-110460, 3GPP Tsg-Ran WG2 #72bis, Dublin, Ireland, Jan. 17-21, 2011, 3 pages.

LG Electronics, Inc., "RLF report indicating use of ABS," Agenda Item: 7.4.1, 3GPP TSG-RAN WG2 #73, R2-111253, Taipei, Taiwan, Feb. 21-25, 2011, 3 pages.

Nokia Siemens Networks, Qualcomm Incorporated, Samsung, Interdigital Communications, "Enabling reporting of ABS resource status for eICIC purposes," R3-110036, 3GPP TSG-RAN WG3 Meeting #70-bis, Work item code: eICIC_LTE-Core, Dublin, Ireland, Jan. 17-21, 2011, 57 pages.

Notification of Reasons for Refusal, dated Oct. 11, 2016, for Japanese Application No. 2015-174789, 4 pages.

NTT Docomo, Inc., "Necessary Changes for RLF reporting enhancements," R2-111764, 3GPP TSG-RAN2 Meeting #73, Taipei, Taiwan, Feb. 21-25, 2011, draft, 17 pages.

Qualcomm Incorporation, R2, "Introduction of time domain ICIC," R2-106943, 3GPP TSG-RAN WG2 Meeting #72, Jacksonville, US, Nov. 15-19, 2010, 4 pages.

Taiwanese Search Report, dated Oct. 29, 2015, for Taiwanese Application No. 101103048, 2 pages.

ZTE, "The optimization of RLF reporting," Agenda Item: 16.1, 3GPP TSG RAN WG3 #70bis, R3-110151, Dublin, Ireland, Jan. 17-21, 2011, 2 pages.

* cited by examiner

FIG. 14

```
RLF-Report-r9 ::=                    SEQUENCE {
   measResultLastServCell-r9            SEQUENCE {
      rsrpResult-r9                        RSRP-Range,
      rsrqResult-r9                        RSRQ-Range             OPTIONAL
   },
   measResultNeighCells-r9              MeasResultNeighCells      OPTIONAL,
   ...
}

MeasResultNeighCells ::=             SEQUENCE {
   measResultListEUTRA                  MeasResultList2EUTRA-r9     OPTIONAL,
   measResultListUTRA                   MeasResultList2UTRA-r9      OPTIONAL,
   measResultListGERAN                  MeasResultListGERAN         OPTIONAL,
   measResultsCDMA2000                  MeasResultList2CDMA2000-r9  OPTIONAL
}

MeasResultList2EUTRA-r9 ::=          SEQUENCE (SIZE (1..maxFreq)) OF MeasResult2EUTRA-r9

MeasResult2EUTRA-r9 ::=              SEQUENCE {
   carrierFreq-r9                       ARFCN-ValueEUTRA,
   measResultList-r9                    MeasResultListEUTRA
}

MeasResultList2UTRA-r9 ::=           SEQUENCE (SIZE (1..maxCellReport)) OF MeasResult2UTRA-r9

MeasResult2UTRA-r9 ::=               SEQUENCE {
   carrierFreq-r9                       ARFCN-ValueUTRA,
   measResultList-r9                    MeasResultListUTRA
}

MeasResultList2CDMA2000-r9 ::=       SEQUENCE (SIZE (1..maxCellReport)) OF
MeasResult2CDMA2000-r9

MeasResult2CDMA2000-r9 ::=           SEQUENCE {
   carrierFreq-r9                       CarrierFreqCDMA2000,
   measResultList-r9                    MeasResultsCDMA2000
}

MeasResultListEUTRA ::=              SEQUENCE (SIZE (1..maxCellReport)) OF MeasResultEUTRA MeasResultEUTRA ::=SEQUENCE {
   physCellId                           PhysCellId,
   cgi-Info                          SEQUENCE {
      cellGlobalId                         CellGlobalIdEUTRA,
      trackingAreaCode                     TrackingAreaCode,
      plmn-IdentityList                    PLMN-IdentityList2         OPTIONAL
   }                                                                  OPTIONAL,
   measResult                        SEQUENCE {
      rsrpResult                           RSRP-Range                 OPTIONAL,
      rsrqResult                           RSRQ-Range                 OPTIONAL,
      ...,
      [[ additionalSI-Info-r9              AdditionalSI-Info-r9       OPTIONAL
      ]]
   }
}
```

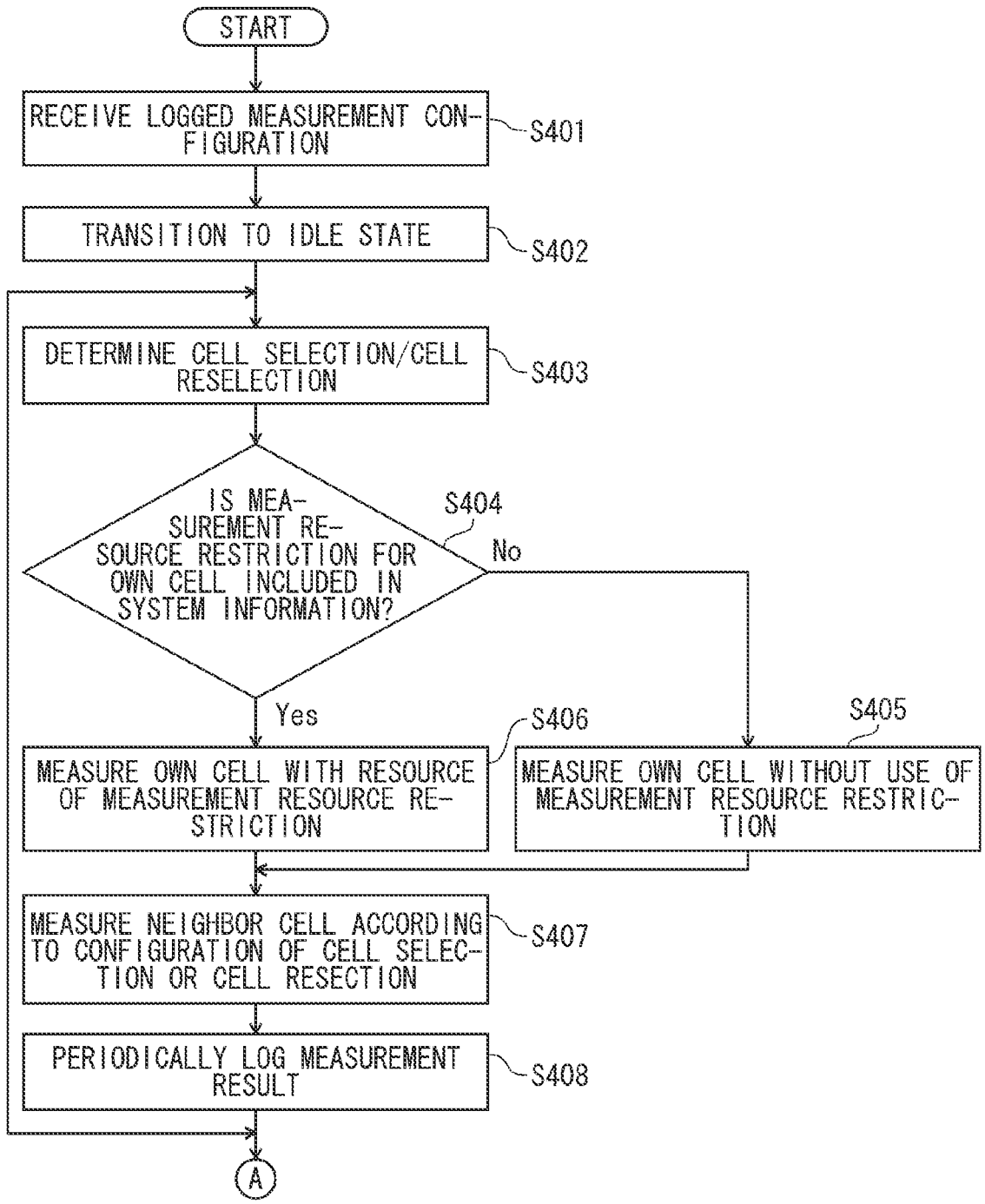

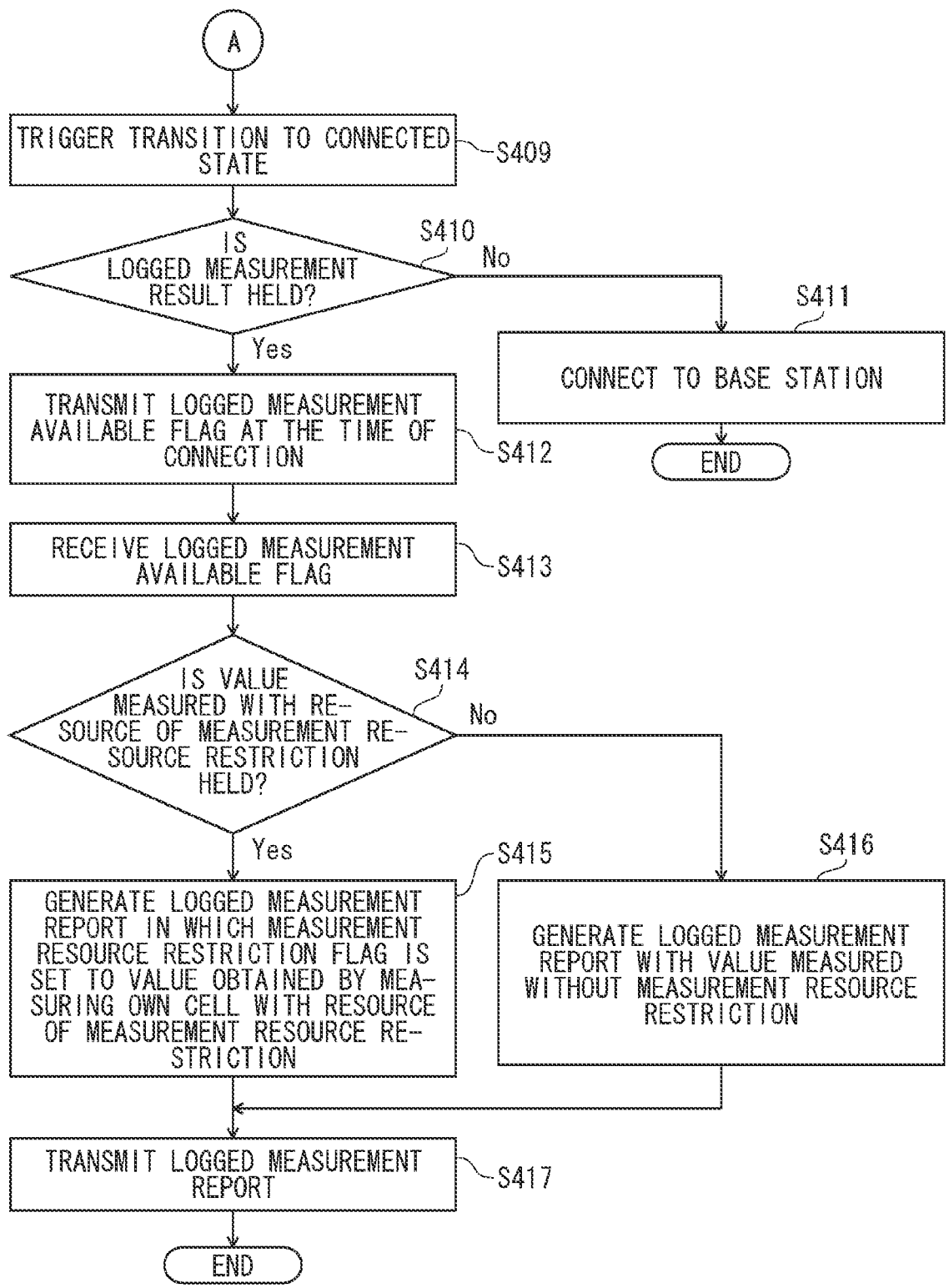

WIRELESS COMMUNICATION TERMINAL, WIRELESS COMMUNICATION BASE STATION, WIRELESS COMMUNICATION SYSTEM, AND REPORTING METHOD

BACKGROUND

Technical Field

The present invention relates to a wireless communication system that reduces a traffic volume in transmission to a wireless communication terminal, or reduces a transmission power of a wireless signal, and a wireless communication terminal and a wireless communication base station used in the wireless communication system, and a reporting method for the wireless communication terminal.

Background Art

Standards Body 3GPP (The 3rd Generation Partnership Project) advances the standardization of LTE-Advanced (Long Term Evolution Advanced: LTE-A) as an LTE (long Term Evolution) system-compatible next-generation communication standard. In the LTE, a wireless communication base station (E-UTRAN NodeB: eNB) of a network (Evolved Universal Terrestrial Radio Access Network (E-UTRAN) provides one or more communication cells. A wireless communication terminal (User Equipment: UE) belongs to one of the communication cells. Hereinafter, the wireless communication base station (eNB) is called merely "base station", the communication cell is called merely "cell", and the wireless communication terminal (UE) is called merely "terminal".

In the LTE, in order to perform self-optimization of the network (Self Optimizing Network: SON), the terminal provides information at the time of radio link failure (Radio Link Failure: RLF) to the base station. The terminal detects the radio link failure (RLF) in the following three cases.

1. When an instruction of out-of-sync (out-of-sync) is continuously detected N310 times in a physical layer, a count of a given time T310 starts. Then, if in-sync is not continuously detected in the physical layer N311 times, T310 expires, and the terminal detects the RLF. The values of T310, N310, and N311 are notified of from the base station. If those values are not notified, the terminal uses a predetermined value.
2. When a random access problem (Random Access Problem) is instructed from a media access control (Media Access Control: MAC) layer, the terminal detects the RLF.
3. Arrival at the maximum number of retransmission is instructed from a radio link control (Radio Link Control: RLC) layer, the terminal detects the RLF.

When the terminal maintains an AS security (Access Stratum Security) when detecting the radio link failure (RLF), the terminal starts an RRC connection reestablishment (Radio Resource Control Connection Re-establishment: RRC Connection Re-establishment).

FIG. 12 is a timing chart when the terminal performs the RRC connection reestablishment. Upon detecting the radio link failure (RLF), the terminal detects a suitable cell (Suitable Cell) with the use of cell selecting means, and selects the cell. Then, the terminal transmits an RRC connection reestablishment request message (RRC Connection Reestablishment Request) to the base station of the cell selected by the cell selection. Upon receiving the RRC connection reestablishment request message from the terminal, the base station determines whether to accept the RRC connection reestablishment request message of the terminal, or not. When determining to accept the terminal, the base station transmits an RRC connection reestablishment message (RRC Connection Reestablishment) to the terminal. Upon receiving the RRC connection reestablishment message, the terminal generates an RRC connection reestablishment complete message (RRC Connection Reestablishment Complete). If RLF information related to the RLF that has been finally generated is available, the terminal includes an RLF information available flag (rlf-InfoAvailable) in the RRC connection reestablishment complete message, and sets the flag as true (true). The terminal transmits the RRC connection reestablishment complete message to the base station. With the above operation, the terminal performs the RRC connection reestablishment.

FIG. 13 is a timing chart illustrating an example in which the terminal provides the information at the time of the radio link failure to the base station. The terminal transmits the RRC connection reestablishment complete message in which the RLF information available flag (rlf-InfoAvailable) is included, and the flag is set to the true (true), to the base station. The base station receives the RRC connection reestablishment complete message in which the RLF information available flag is set to the true (true). The base station determines whether the information from the terminal at the time of the radio link failure is necessary, or not. When determining that the information from the terminal is necessary, the base station transmits a terminal information request message (UEInformationRequest) in which an RLF report request flag (rlf-ReportReq) is set to the true (true) to the terminal in order to request transmission of the information at the time of the radio link failure to the terminal. The terminal receives a terminal information request message in which the RLF report request flag Z (rlf-ReportReq) is set to the true (true). The terminal generates an RLF report (rlf-report), generates a terminal information response message (UE Information Response) in which the RLF report (rlf-report) is included, and transmits the terminal information response message to the base station.

FIG. 14 is a diagram illustrating an example of a configuration of the RLF report (rlf-report). As illustrated in FIG. 14, the RLF report (rlf-report) is configured by a measurement result of an own cell finally connected, and a measurement result of a neighbor cell at the time of generating the RLF. The measurement result of the own cell includes a received power (Reference Signal Received Power: RSRP) or a received quality (Reference Signal Received Quality: RSRQ). On the other hand, the measurement result of the neighbor cell is listed for each radio access technology (Radio Access Technology: RAT), and further listed for each frequency. The respective lists are arranged in order from the best cell of the measurement result at the time of generating the RLF. The terminal is set to measure the frequency of the radio access technology which needs to be measured. The measurement result included in the RLF report (rlf-report) is intended for the cell of the frequency of the radio access technology which has been set to be measured (measurement) by the terminal.

The base station or the network can optimize the network on the basis of this information.

In the LTE-A, as a method of an inter-cell interference coordination (Inter-cell Interference Coordination: ICIC), an almost blank subframe (Almost Blank Subframe: ABS) is used for control to prevent an interference between cells in a time domain to protect a resource. In this control, with the provision of a period during which the base station does not transmit the signal, or the transmission power is reduced, to thereby reduce an interference affecting a communication between the other base station and the terminal.

The ABS is characterized by the following elements.

In the ABS a cell specific reference signal (Cell Specific Reference Signal: CRS) is always transmitted.

If the ABS matches a multimedia broadcast multicast service single frequency network (Multimedia Broadcast multicast service Single Frequency Network: MBSFN) subframe, the CRS is not transmitted in a data domain.

If the timing of the ABS matches with a primary synchronization signal (Primary Synchronization Signal: PSS), a secondary synchronization signal (Secondary Synchronization Signal: SSS), a physical broadcast channel (Physical Broadcast Channel: PBCH), a system information block type 1 (System Information Block Type 1: SIB1), paging (Paging), or a positioning reference signal (Positioning Reference Signal: PRS), they are transmitted.

In the ABS, a channel state information reference signal (Channel State Information Reference signal: CSI-RS) can be transmitted.

When the MBSFN subframe is included in the pattern of the ABS, the MBSFN subframe can be used for the time domain inter-cell interference coordination. An example of the method of using the ABS having the above features will be described below.

FIGS. 15A and 15B are diagrams illustrating an example using the ABS. As illustrated in FIGS. 15A and 15B, in addition to a cell arrangement centered on a macrocell in which a coverage area of the cell is wide, a network in which a low power node (Low Power Node: LPN) in which the coverage area of the cell is narrow is arranged within the macrocell has been studied in order to efficiently cover a local area such as an indoor facility a large volume of traffic is concentrated. The low power node is configured by a cell that is managed by a relay node (Relay Node: RN), a picocell that has the same function as that of the macrocell, and is low in the transmission power, or a CSG (Closed Subscriber Group) cell that can be connected with only a specific member without provision of an interface (X2 interfaces) between the base stations.

FIG. 15A illustrates an example in which the picocell is arranged within the coverage of the macrocell on the same frequency. For example, the time domain inter-cell interference coordination is used by the terminal that is being connected by the picocell, which is located at an end of the picocell. For example, the time domain inter-cell interference coordination is used to distribute a load of the macrocell into the picocell. In order to protect the specific subframe of the picocell from an interference with the macrocell, the ABS is used by the macrocell. The terminal connected to the picocell performs a radio resource measurement (Radio Resource Measurement: RRM) for a movement control, a radio link monitoring (Radio Link Monitoring: RLM), and a channel state information measurement (Channel State Information measurement: CSI measurement) with the use of the protected resource. The terminal can know the protected resource by allowing a measurement resource restriction (Measurement Resource Restriction) to be notified. As a result, a measurement precision of the picocell under a strong interference with the macrocell can be enhanced by the measurement at timing when the interference with the macrocell is reduced. That is, a range of the picocell can be widened, the connection with the picocell is easily maintained, and the load distribution can be performed.

Also, the terminal that is being connected to the neighbor cell measures the picocell with the use of a measurement resource restriction (Measurement Resource Restriction), thereby being capable of enhancing the measurement precision of the picocell under the strong interference with the macrocell. As a result, handover (handover) of the connection to the picocell is easily performed, and the load distribution can be performed.

FIG. 15B illustrates an example in which the CSG cell is arranged within the coverage of the macrocell. For example, the time domain inter-cell interference coordination is used by the terminal that is being connected to the macrocell located on an end of the CSG cell. For example, the terminal that is not allowed to be connected to the CSG cell is used for maintaining the connection with the macrocell.

The CSG cell uses the ABS to reduce the interference, thereby being capable of protecting the subframe of the specific macrocell from the interference. The terminal that is not allowed to be connected to the CSG cell is notified of the protected resource as the measurement resource restriction, and can continue to be connected to the macrocell under the strong interference with the CSG cell by the measurement at the timing when the interference with the CSG cell is reduced. The measurement contents include RRM, RLM, and CSI.

CITATION LIST

Non-Patent Literature

Non-patent Literature 1: 3GPP TS36.300 v10.2.0, "Evolved Universal Terrestrial Radio Access (E-UTRA) and Evolved Universal Terrestrial Radio Access Network (E-UTRAN)"

Non-patent Literature 2: 3GPP TS36.331 v10.0.0, "Evolved Universal Terrestrial Radio Access (E-UTRA) Radio Resource Control (RRC)"

BRIEF SUMMARY

Technical Problem

Under the environments where the ABS is used, a precision in the measurement is different between a value measured in the subframe of the ABS and a value measured in the subframe which is not the ABS. Therefore, in the conventional RLF report (rlf-report), there arises such a problem that a precision with which the base station grasps the state of the terminal is reduced.

An object of the present invention is to provide a wireless communication terminal, a wireless communication base station, a wireless communication system, and a reporting method, in which an external device can precisely grasp a state in which the radio link failure occurs in the wireless communication terminal even in the environment where the ABS is used.

Solution to Problem

The present invention provides a wireless communication terminal used in a wireless communication system for performing a control not to transmit signals, or to transmit signals with a reduction in a transmission power in a part of radio resources for a downlink signal in a communication cell provided by a wireless communication base station, the wireless communication terminal including: a receiver that is configured to receive control information referred to in generating a report related to a measurement result of the communication cell provided by the wireless communication base station; a radio link monitoring section that is configured to monitor a state of a radio link with an own cell which indicates a communication cell in connection; a measurement section that is configured to perform a measurement on a reception of the downlink signal in the communication cell provided by the wireless communication base station; a report generator that is configured to generate a radio link failure report including a measurement result when a radio link failure occurs in the own cell; and a transmitter that is configured to transmit the radio link failure report, wherein if an instruction for restricting measurement to a part of the radio resources is included in the control information from the wireless communication base station after the radio link failure occurs, the report generator generates the radio link failure report including a measurement result in the radio resources as instructed when the radio link failure occurs.

The present invention provides a wireless communication terminal used in a wireless communication system for performing a control not to transmit signals, or to transmit signals with a reduction in a transmission power in a part of radio resources for a downlink signal in a communication cell provided by a wireless communication base station, the wireless communication terminal including: a receiver that is configured to receive control information related to restriction of the radio resources for an own cell or a neighbor cell to be measured, from the wireless communication base station; a measurement section that is configured to receive a reference signal in the own cell or the neighbor cell, and to perform a measurement on reception of the downlink signal; a report generator that is configured to generate a radio link failure report including a result of the measurement; and a transmitter that is configured to transmit the radio link failure report, wherein if an instruction for restricting the measurement of the own cell or the neighbor cell to a part of radio resources is included in the control information from the wireless communication base station, the report generator generates the radio link failure report including a measurement result of the own cell or the neighbor cell in the radio resources as instructed.

The present invention provides a wireless communication base station used in a wireless communication system for performing a control not to transmit signals, or to transmit signals with a reduction in a transmission power in a part of radio resources for a downlink signal in a communication cell provided by the wireless communication base station, the wireless communication base station including: a receiver that is configured to receive a radio link failure report including a measurement result restricted to the part of radio resources, from a wireless communication terminal used in the wireless communication system; and a controller that is configured to determine whether or not the received radio link failure report is the measurement restricted to the part of radio resources.

The present invention provides a wireless communication base station used in a wireless communication system for performing a control not to transmit signals, or to transmit signals with a reduction in a transmission power in a part of radio resources for a downlink signal in a communication cell provided by the wireless communication base station, the wireless communication base station including: a receiver that is configured to receive a radio link failure report including a measurement result in an own cell or a neighbor cell, which is restricted to the part of radio resources, from a wireless communication terminal used in the wireless communication system; and a controller that is configured to determine whether or not the received radio link failure report is the measurement result restricted to the part of radio resources.

The present invention provides a wireless communication system for performing a control not to transmit signals, or to transmit signals with a reduction in a transmission power in a part of radio resources for a downlink signal in a communication cell provided by first and second wireless communication base stations, wherein the first wireless communication base station transmits control information referred to by a wireless communication terminal in generating a report related to a measurement result of the communication cell provided by the first wireless communication base station, the wireless communication terminal includes: a receiver that is configured to receive the control information; a radio link monitoring section that is configured to monitor a state of a radio link with an own cell which indicates a communication cell in connection; a measurement section that is configured to perform a measurement on a reception of the downlink signal in the communication cell provided by the first wireless communication base station; a report generator that is configured to generate a radio link failure report including a measurement result when a radio link failure occurs in the own cell; and a transmitter that is configured to transmit the radio link failure report, wherein if an instruction for restricting measurement to a part of the radio resources is included in the control information from the first wireless communication base station after the radio link failure occurs, the report generator generates the radio link failure report including a measurement result in the radio resources as instructed when the radio link failure occurs, and the second wireless communication base station includes: a receiver that is configured to receive, from the wireless communication terminal, the radio link failure report including a measurement result restricted to the part of radio resources, generated by the wireless communication terminal; and a controller that is configured to determine whether or not the received radio link failure report is the measurement restricted to the part of radio resources.

The present invention provides a wireless communication system for performing a control not to transmit signals, or to transmit signals with a reduction in a transmission power in a part of radio resources for a downlink signal in a communication cell provided by first and second wireless communication base stations, wherein the first wireless communication base station transmits control information related to restriction of the radio resources when a wireless communication terminal measures an own cell or a neighbor cell which indicates a cell provided by the first wireless communication base station, to the wireless communication terminal, the wireless communication terminal includes: a receiver that is configured to receive the control information; a measurement section that is configured to receive a reference signal in the communication cell provided by the first wireless communication base station, and to perform a measurement on reception of the downlink signal; a report generator that is configured to generate a radio link failure report including a result of the measurement; and a transmitter that is configured to transmit the radio link failure report, wherein if an instruction for restricting the measurement of the own cell or the neighbor cell to a part of radio resources is included in the control information from the first wireless communication base station, the report generator generates the radio link failure report including a measurement result of the own cell or the neighbor cell in the radio resources as instructed, and the second wireless communication base station includes: a receiver that is configured to receive, from the wireless communication terminal, the radio link failure report including a measurement result in an own cell or a neighbor cell, which is restricted to the part of radio resources, generated by the wireless communication terminal; and a controller that is configured to determine whether or not the received radio link failure report is the measurement result restricted to the part of radio resources.

The present invention provides a reporting method of a wireless communication terminal used in a wireless communication system for performing a control not to transmit signals, or to transmit signals with a reduction in a transmission power in a part of radio resources for a downlink signal in a communication cell provided by a wireless communication base station, the reporting method including: receiving control information referred to in generating a report related to a measurement result of the communication cell provided by the wireless communication base station; monitoring a state of a radio link with an own cell which indicates a communication cell in connection; performing a measurement on a reception of the downlink signal in the communication cell provided by the wireless communication base station; if an instruction for restricting measurement to a part of the radio resources is included in the control information from the wireless communication base station after the radio link failure occurs in the own cell, generating a radio link failure report including a measurement result in the radio resources as instructed when the radio link failure occurs; and transmitting the radio link failure report.

The present invention provides a reporting method of a wireless communication terminal used in a wireless communication system for performing a control not to transmit signals, or to transmit signals with a reduction in a transmission power in a part of radio resources for a downlink signal in a communication cell provided by a wireless communication base station, the reporting method including: receiving control information related to restriction of the radio resources for an own cell or a neighbor cell to be measured, from the wireless communication base station; receiving a reference signal in the own cell or the neighbor cell, and performing a measurement on reception of the downlink signal; generating a radio link failure report including a result of the measurement; and transmitting the radio link failure report, wherein if an instruction for restricting the measurement of the own cell or the neighbor cell to a part of radio resources is included in the control information from the wireless communication base station, the radio link failure report is generated to include a measurement result of the own cell or the neighbor cell in the radio resources as instructed.

Advantageous Effects of Invention

According to the wireless communication terminal, the wireless communication base station, the wireless communication system, and the reporting method according to the present invention, the external device can precisely grasp the state in which the radio link failure occurs in the wireless communication terminal even in the environment where the ABS is used.

BRIEF DESCRIPTION OF THE SEVERAL VIEWS OF THE DRAWINGS

FIG. 14 is a diagram illustrating an example of a configuration of an RLF report (rlf-report).

FIG. 19 is a flowchart illustrating an example of the operation of the terminal according to the fourth embodiment.

FIG. 20 is a flowchart illustrating an example of the operation of the terminal according to the fourth embodiment.

DETAILED DESCRIPTION

Figure 1:
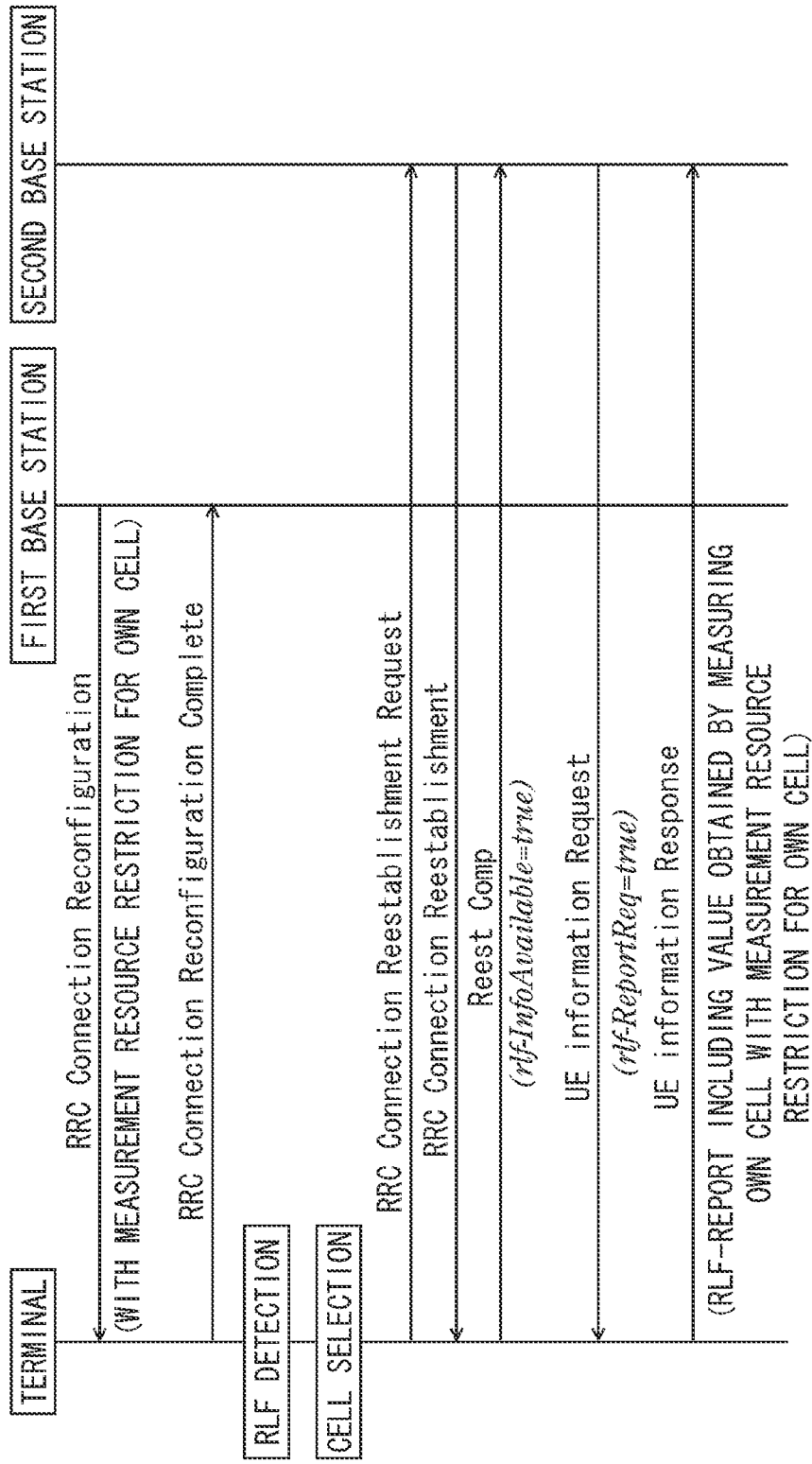
FIG. 1 is a timing chart when a terminal transmits an RLF report in a wireless communication system according to a first embodiment.

A wireless communication system according to embodiments of the present invention will be described in detail with reference to the drawings. The wireless communication system according to the embodiments which will be described below includes at least one wireless communication terminal, and at least one wireless communication base station that can communicate with the wireless communication terminal through a wireless communication network. In the following description, the wireless communication terminal is called simply "terminal". The terminal is, for example, a cellular phone. Also, the wireless communication base station is called simply "base station". The base station is a base station that can be wirelessly connected to the terminal, which is a generic term including, for example, a macro base station that manages a macrocell, a pico base station that manages a picocell, a remote radio head (Remote Radio Head: RRH) located in an area distant from the base station, a relay device (relay node or repeater) wirelessly connected to the base station, and a CSG base station that manages a CSG cell.

The wireless communication system uses a mobile communication technology of an LTE or an LTE-A standardized by 3GPP (The 3rd Generation Partnership Project). The mobile communication technology used by the wireless communication system is not limited to the above standards, but may be a wireless LAN (Wireless Local Area Network), WiMAX (Worldwide Interoperability for Microwave Access) such as IEEE802.16, IEEE802.16e, or IEEE802.16m, 3GPP2, SAE (System Architecture Evolution), UMTS (Universal Mobile Telecommunications System), or a 4th generation mobile communication standard.

Each of the wireless communication base stations configures at least one communication cell. The communication cell means a wireless network object that can be uniquely identified by the terminal on the basis of a difference in identifiers allocated to geographical areas or frequencies used in the geographical areas. In the following description, the communication cell is called simply "cell". One or more cells are configured by one wireless communication base station for each of one or more carrier frequencies. The above configuration represents a basic concept, and the wireless communication base station may configure one cell in cooperation with another wireless communication base station. Also, the terminal performs a communication by the aid of at least one cell configured by the wireless communication base station.

Hereinafter, the wireless communication system according to first to fourth embodiments will be described below in order. In the first to fourth embodiments, the configurations having the same function are denoted by identical reference symbol, and redundant descriptions will be omitted.

First Embodiment

A wireless communication system according to a first embodiment will be described with reference to FIGS. 1 to 4. The wireless communication system according to the first embodiment includes the terminal and the base station described above. The terminal has a function of receiving a reference signal transmitted from the base station for each cell in a downlink, and reporting a measurement result derived on the basis of a given calculation expression to the base station. Also, the terminal has a function of transmitting an RLF report to the base station when the RLF occurs. Each of the base stations allocates and manages a radio resource (for example, frequency band in a frequency domain or a time domain) with respect to each of the terminals. Further, the base station has a function of an access point of the wireless access network for the terminal.

FIG. 1 is a timing chart when a terminal transmits the RLF report in the wireless communication system according to the first embodiment. As illustrated in FIG. 1, a base station (first base station) connected with a terminal transmits an RRC connection reconfiguration message (RRC Connection Reconfiguration) to the terminal. The RRC connection reconfiguration message includes control information and a measurement configuration (Measurement Configuration: MC). The control information includes measurement resource restrictions (Measurement Resource Restriction) for measurement of the own cell and radio link monitoring if the occasion demands. The measurement resource restriction is information for specifying a resource to be measured by the terminal to enhance a measurement precision. For example, the measurement resource restriction is a technique used for the purpose of enhancing the measurement precision. Also, for example, a specific resource instructed by the measurement resource restriction is a resource low in an interference with the cell measured by the terminal. Also, for example, a specific resource instructed by the measurement resource restriction is a resource (ABS) in which a signal that is transmitted in a neighbor cell is reduced. Also, for example, a specific resource instructed by the measurement resource restriction is a resource (other than ABS) in which the signal that is transmitted by the neighbor cell is not reduced.

Upon receiving the RRC connection reconfiguration message from the base station, the terminal transmits an RRC connection reconfiguration complete message (RRC Connection Reconfiguration Complete) to the base station. Also, the terminal performs measurement (Measurement) and radio link monitoring on the basis of the control information and the measurement configuration from the base station. Upon detecting the radio link failure (RLF), the terminal detects a suitable cell (Suitable Cell) with the use of cell selecting means, and selects the cell. Then, the terminal transmits an RRC connection reestablishment request message (RRC Connection Reestablishment Request) to a base station (second base station) selected by the cell selection.

Upon receiving the RRC connection reestablishment request message from the terminal, the base station determines whether to accept the RRC connection reestablishment request of the terminal, or not. Upon determining to accept the terminal, the base station transmits an RRC connection reestablishment message (RRC Connection Reestablishment) to the terminal. Upon receiving the RRC connection reestablishment message, the terminal generates the RRC connection reestablishment complete message (RRC Connection Reestablishment Complete). If the RLF information related to the radio link failure (RLF) occurred at the last time is available, the terminal includes an RLF information available flag (rlf-InfoAvailable) in the RRC connection reestablishment message, and sets the flag as true (true). The terminal transmits the RRC connection reestablishment complete message to the base station.

As described above, the terminal completes the RRC connection reestablishment. On the other hand, the base station receives the RRC connection reestablishment complete message in which the RLF information available flag is set to the true (true) from the terminal. The base station determines whether the information from the terminal at the time of the radio link failure is necessary, or not. When determining that the information from the terminal is necessary, the base station transmits the terminal information request message (UEInformationRequest) in which an RLF report request flag (rlf-ReportReq) is set to the true (true) to the terminal in order to request the terminal to transmit the information at the time of radio link failure. The terminal receives the terminal information request message in which the RLF report request flag is set to the true. If the measurement resource restriction (Measurement Resource Restriction) for measurement of the own cell is included in the control information received from the first base station, the terminal generates an RLF report (rlf-report) including the value obtained by measuring the own cell with the use of the measurement resource restriction. The terminal generates a terminal information response message (UEInformationResponse) including the RLF report, and transmits the message to the base station.

The RLF report includes the value obtained by measuring the own cell with the use of the measurement resource restriction in addition to the value obtained by measuring the own cell without use of the measurement resource restriction. With this configuration, because the measurement result when the measurement resource restriction is used can be compared with the measurement result when the measurement resource restriction is not used, a gain obtained by using the measurement resource restriction can be calculated, and the network can be optimized.

Also, when the value obtained by measuring the own cell with the use of the measurement resource restriction is included in the RLF report, the value obtained by measuring the own cell without use of the measurement resource restriction may not be included. With this configuration, because the base station can grasp a state in which the terminal is actually used, the network can be optimized. Also, as compared with a case in which both of the measurement result of the own cell when the measurement resource restriction is not used, and the measurement result of the own cell when the measurement resource restriction is used are included in the RLF report, the size of the RLF report can be reduced.

When the value obtained by measuring the own cell with the use of the measurement resource restriction is included in the RLF report, that the value is measured by using the measurement resource restriction may be notified with the use of the flag. With this configuration, because the base station can explicitly know that the measurement result is the value measured by using the measurement resource restriction, the base station can easily know that any state has been measured. This flag (hereinafter referred to as "measurement resource restriction flag") may be replaced with an instruction of one bit. With the exchange of the measurement configuration information between the base stations, the base station may grasp whether the measurement result is the value measured with the use of the measurement resource restriction, or not. With the above configuration, the addition of signaling in the radio resource can be suppressed.

The above description is exemplary, and the RLF report may be transmitted by a technique other than the above technique. For example, the terminal transitions to an idle state (Idle) after having detected the RLF. Thereafter, when the connection is newly established, the RLF information available flag (rlf-InfoAvailable) may be set to the true (true) and included in an RRC connection setup complete message (RRC Connection Setup Complete), and transmitted to the base station. With the above configuration, because the base station can know that the terminal holds the RLF report, the base station transmits the terminal information request message in which the RLF report request (rlf-Reportreq) is set to the true to the terminal, and can obtain the terminal information response message including the RLF report (rlf-report) from the terminal.

In the system described above, the first base station and the second base station may be configured by an identical base station. Also, a destination of the RLF report (rlf-report) from the terminal is not limited to the second base station, but may be another base station with which the terminal can communicate.

Configuration of Terminal According to First Embodiment

Figure 2:
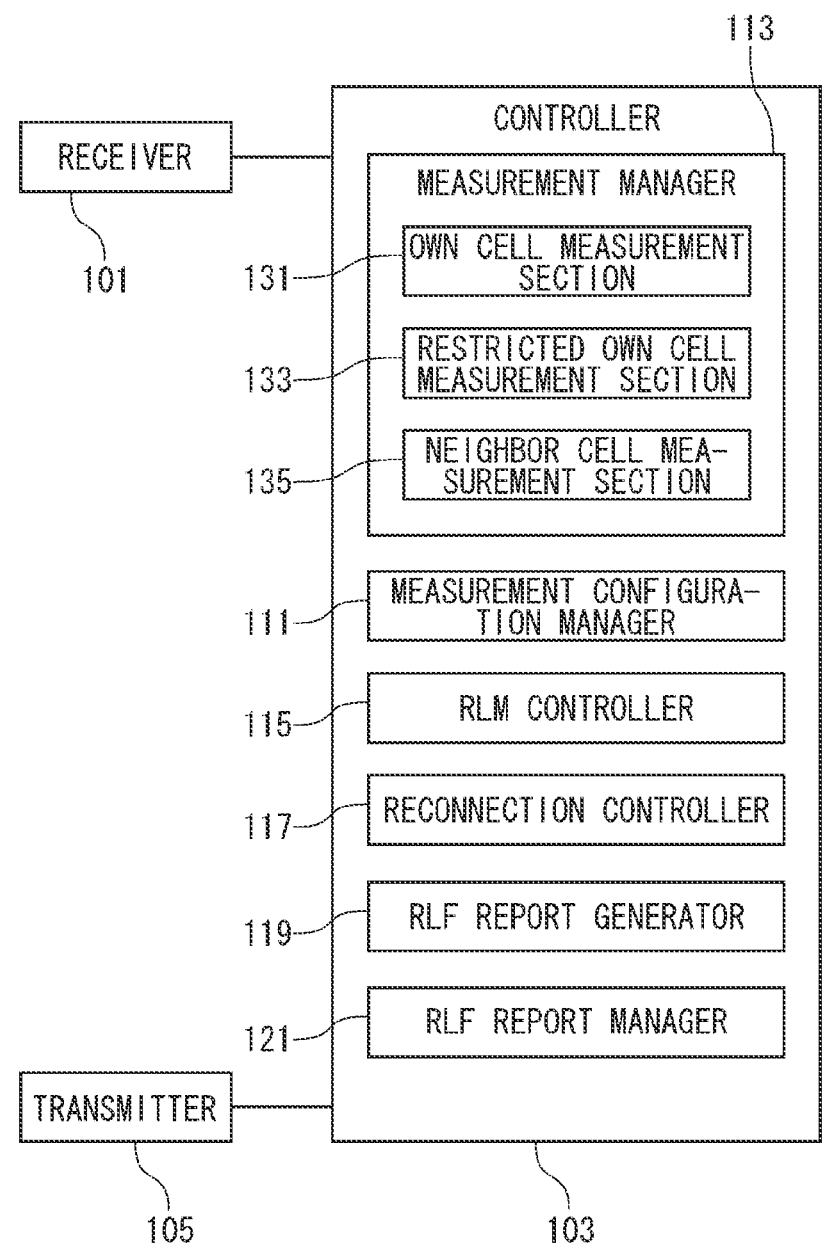
FIG. 2 is a block diagram of the terminal configuring the wireless communication system according to the first embodiment.

FIG. 2 is a block diagram of the terminal configuring the wireless communication system according to the first embodiment. As illustrated in FIG. 2, the terminal according to the first embodiment includes a receiver 101, a controller 103, and a transmitter 105. The controller 103 includes a measurement configuration manager 111, a measurement manager 113, an RLM controller 115, a reconnection controller 117, an RLF report generator 119, and an RLF report manager 121. Also, the measurement manager 113 includes an own cell measurement section 131, a restricted own cell measurement section 133, and a neighbor cell measurement section 135.

The receiver 101 receives system information or individual control information through a downlink of the cell which is being used by the terminal according to an instruction from the controller 103. The receiver 101 outputs the received system information and individual control information to the controller 103.

The receiver 101 receives a cell specific reference signal (Cell specific Reference Signal: CRS) or a received signal strength indication (Received Signal Strength Indication: RSSI) of the own cell according to an instruction from the own cell measurement section 131 installed in the measurement manager 113. The receiver 101 outputs the received CRS or RSSI to the own cell measurement section 131. Also, the receiver 101 receives the CRS or the RSSI of the own cell in the specific resource according to an instruction from the restricted own cell measurement section 133 installed in the measurement manager 113 of the controller 103. The receiver 101 outputs the received CRS or RSSI to the restricted own cell measurement section 133. Also, the receiver 101 receives the CRS or the RSSI of the neighbor cell according to an instruction from the neighbor cell measurement section 135 installed in the measurement manager 113 of the controller 103. The receiver 101 outputs the received CRS or RSSI to the neighbor cell measurement section 135 together with a frequency and the PCI. Further, upon receiving an instruction for measurement of the CRS of the own cell from the RLM controller 115 of the controller 103, the receiver 101 receives the CRS of the own cell, and outputs the CRS to the RLM controller 115. Also, upon receiving an instruction for measurement of the CRS of the own cell in the specific resource from the RLM controller 115, the receiver 101 receives the CRS of the own cell in the above resource, and outputs the CRS to the RLM controller 115.

The controller 103 outputs a measurement configuration (Measurement Configuration: MC), a physical cell identifier (Physical Cell ID: PCI) of the own cell, and the frequency of the own cell from the individual control information to the measurement configuration manager 111. If the measurement resource restriction for the own cell is included in the individual control information, the controller 103 outputs the measurement resource restriction for the own cell to the measurement configuration manager 111. The controller 103 outputs a response message to the individual control information to the transmitter 105. If the measurement resource restriction for the own cell is included in the individual control information, the controller 103 outputs the measurement resource restriction for the own cell and the configuration necessary for the RLM to the RLM controller 115. Upon receiving the RRC connection reestablishment message, the controller 103 outputs the above message to the reconnection controller 117. When the terminal information request message (UEInformationRequest) in which the RLF report request flag (rlf-ReportReq) is set to the true (true) is input to the controller 103, the controller 103 instructs the RLF report manager 121 to transmit the RLF report.

The measurement configuration manager 111 outputs the PCI of the own cell, the frequency of the own cell, and the configuration necessary for measurement of the own cell to the own cell measurement section 131. When the measurement resource restriction (Measurement Resource Restriction) for the own cell is input to the measurement configuration manager 111, the measurement configuration manager 111 outputs the measurement resource restriction for the own cell, the PCI of the own cell, the frequency of the own cell, and the information necessary for measurement of the own cell to the restricted own cell measurement section 133. The measurement configuration manager 111 outputs the configuration necessary for measurement of the neighbor cell included in the measurement configuration to the neighbor cell measurement section 135 of the measurement manager 113.

The measurement manager 113 manages the RSRP and the RSRQ of the own cell in distinction between the RSRP and the RSRQ measured without the use of the measurement resource restriction, and the RSRP and the RSRQ measured with the use of the measurement resource restriction. The measurement manager 113 calculates the RSRQ according to the RSRP and the received signal strength indication (Received Signal Strength Indication: RSSI) which have been input from the own cell measurement section 131, and manages the RSRP and the RSRQ as the RSRP and the RSRQ of the own cell which have been measured without the use of the measurement resource restriction. The measurement manager 113 calculates the RSRQ according to the RSRP and the RSSI which have been input from the restricted own cell measurement section 133, and manages the RSRP and the RSRQ as the RSRP and the RSRQ of the own cell which have been measured with the use of the measurement resource restriction. The measurement manager 113 manages the RSRP and the RSRQ of the neighbor cell for each PCI of the respective frequencies. When the measurement manager 113 determines that the measurement of the neighbor cell is necessary, according to the managed value and measurement configuration, the measurement manager 113 instructs the neighbor cell measurement section 135 to measure the neighbor cell. The measurement manager 113 calculates the RSRQ of the cell having the PCI of the above frequency according to the RSRP, the RSSI, the PCI, and the frequency which have been input from the neighbor cell measurement section 135, and manages the RSRP and the RSRQ.

In the same frequency, a common value may be used in the RSSI of the own cell and the neighbor cell, which has been measured without being restricted to the specific resource. Also, in the RSSI of the own cell, a common value may be used between the RSSI of the own cell measured without being restricted to the specific resource, and the RSSI of the own cell measured with the use of the measurement resource restriction.

Upon receiving an instruction for outputting the held information from the RLF report generator 119, the measurement manager 113 outputs the held RSRP and the RSQR of the respective cells to the RLF report generator 119. In this situation, if the RSRP or the RSRQ which has been measured with the use of the measurement resource restriction is present in the own cell, the measurement manager 113 also outputs the above information to the RLF report generator 119. However, because the measurement of the RSRQ is not essential, the own cell measurement section 131, the restricted own cell measurement section 133, and the neighbor cell measurement section 135 may not input the RSSI to the measurement manager 113. Therefore, the measurement manager 113 may output only the RSRP of a part or all of the cells, which is output to the RLF report generator 119, to the RLF report generator 119.

In order to measure the RSRP or the RSSI of the cell having the PCI of the frequency input from the measurement configuration manager 111, the own cell measurement section 131 instructs the receiver 101 to measure the CRS or the RSSI. In order to remove an influence of fading from the value of the CRS or the RSSI which has been input from the receiver 101, the own cell measurement section 131 performs layer 3 filtering on the value input from the receiver 101, and outputs the calculated RSRP or RSSI to the measurement manager 113.

In order to measure the RSRP or RSSI of the cell having the PCI of the input frequency in the resource instructed in the measurement resource restriction for the own cell which has been input from the measurement configuration manager 111, the restricted own cell measurement section 133 instructs the receiver 101 to measure the CRS or the RSSI in the above resource. The restricted own cell measurement section 133 performs the layer 3 filtering on the CRS or RSSI input from the receiver 101, and outputs the calculated RSRP or RSSI to the measurement manager 113.

Upon receiving an instruction for measurement of the neighbor cell from the measurement manager 113, in order to measure the RSRP or RSSI of the cell having the frequency instructed in the measurement configuration, the neighbor cell measurement section 135 instructs the receiver 101 to measure the CRS or the RSSI. The neighbor cell measurement section 135 receives the frequency, the PCI and the CRS, or the RSSI from the receiver 101. The neighbor cell measurement section 135 performs the layer 3 filtering for each cell having the PCI of the above frequency, and outputs the calculated RSRP or RSSI to the measurement manager 113 together with the frequency and the PCI.

In order to perform radio link monitoring (Radio Link Monitoring: RLM), the RLM controller 115 outputs the measurement of the CRS to the receiver 101. Upon receiving the measurement resource restriction for the own cell, in order to monitor the radio link in the resource instructed in the input measurement resource restriction, the RLM controller 115 instructs the receiver 101 to measure the CRS in the above resource. The RLM controller 115 monitors the radio link of the own cell on the basis of the configuration necessary for monitoring the CRS and the RLM which have been input from the receiver 101. If the RLM controller 115 determines that the RLF occurs, the RLM controller 115 notifies the reconnection controller of the occurrence of the RLF.

Upon being notified of the occurrence of the RLF from the RLM controller 115, the reconnection controller 117 instructs the RLF report generator 119 to generate the RLF report. In order to perform the cell selection, the reconnection controller 117 instructs the receiver 101 to measure the frequency and the CRS to be measured. The reconnection controller 117 selects the cell to be connected on the basis of the value input from the receiver 101. The reconnection controller 117 generates the RRC connection reestablishment request message to be transmitted to the selected cell. Upon receiving the RRC connection reestablishment request message, the reconnection controller 117 generates the RRC connection reestablishment complete message. In this situation, upon receiving a fact that the RLF information is available from the RLF report generator 119, the reconnection controller 117 generates the RRC connection reestablishment complete message in which the RLF information available flag is set to the true. The reconnection controller 117 instructs the transmitter 105 to transmit the RRC connection reestablishment request message or the RRC connection reestablishment complete message.

Upon receiving an instruction for generating the RLF report from the reconnection controller 117, the RLF report generator 119 instructs the measurement manager 113 to output the held information. The RLF report generator 119 generates the RLF report on the basis of the information input from the measurement manager 113. The RLF report includes the RSRP or the RSRQ of the own cell which has been measured without the use of the measurement resource restriction, the RSRP or the RSRQ of the own cell which has been measured with the use of the measurement resource restriction, or the RSRP or the RSRQ of the neighbor cell. With this configuration, the measurement result when the measurement resource restriction is used can be compared with the measurement result when the measurement resource restriction is not used. As a result, the gain obtained by using the measurement resource restriction can be calculated, and the network can be optimized.

When the value obtained by measuring the own cell with the use of the measurement resource restriction is included, the RLF report generator 119 may not include the value obtained by measuring the own cell without the use of the measurement resource restriction. With the above configuration, because the state actually used by the terminal can be grasped by the base station, the network can be optimized. Also, as compared with a case in which both of the measurement result of the own cell when the measurement resource restriction is not used, and the measurement result of the own cell when the measurement resource restriction is used are included in the RLF report, the size of the RLF report can be reduced.

When the RSRP or the RSRQ of the own cell which has been measured with the use of the measurement resource restriction of the own cell is included in the RLF report, the RLF report generator 119 may set the measurement resource restriction flag to the true (true). The measurement resource restriction flag may be configured by 1 bit. With the above configuration, because the base station can explicitly know that the measurement result is the value measured with the use of the measurement resource restriction, the base station can easily know that any state has been measured. When the base station can know whether the measurement result is the value obtained by using the measurement resource restriction through the network, or not, by another method, the measurement resource restriction flag is not included in the message configuration. When the RLF report generator 119 generates the RLF report, the RLF report generator 119 outputs that the RLF report has been generated to the reconnection controller 117, and outputs the RLF report to the RLF report manager 121.

When receiving an instruction for transmitting the RLF report to the base station from the controller 103, the RLF report manager 121 generates the terminal information response message including the RLF report input from the RLF report generator 119. The RLF report manager 121 instructs the transmitter 105 to transmit the terminal information response message.

The transmitter 105 transmits the response message to the individual control information, the RRC connection reestablishment request message, the RRC connection reestablishment complete message, or the terminal information response message including the RLF report.

Configuration of Base Station According to First Embodiment

Figure 3:
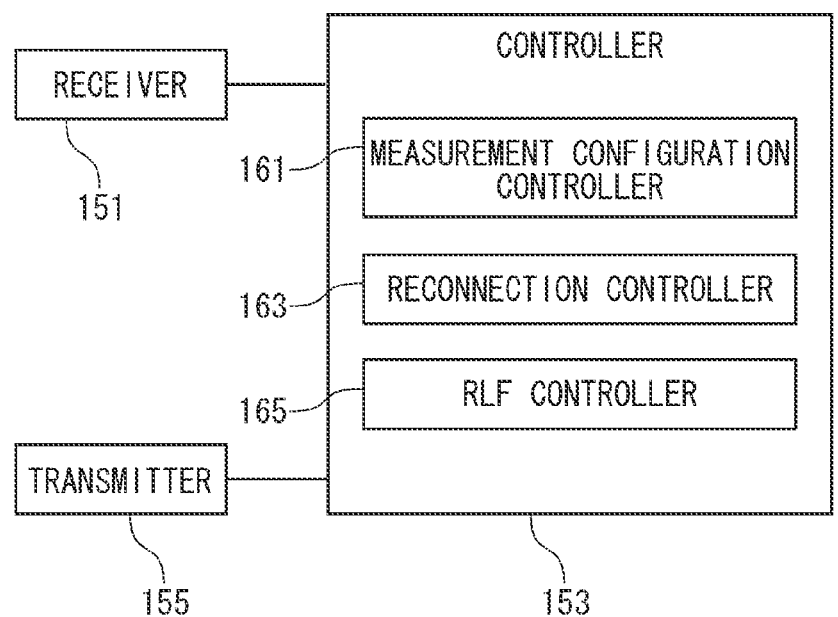
FIG. 3 is a block diagram of a base station configuring the wireless communication system according to the first embodiment.

FIG. 3 is a block diagram of the base station configuring the wireless communication system according to the first embodiment. As illustrated in FIG. 3, the base station according to the first embodiment includes a receiver 151, a controller 153, and a transmitter 155. The controller 153 includes a measurement configuration controller 161, a reconnection controller 163, and an RLF controller 165.

The receiver 151 receives the response message to the individual control information transmitted from the terminal, the RRC connection reestablishment request message, the RRC connection reestablishment complete message, or the terminal information response message, and outputs the received message to the controller 153.

When the controller 153 determines that the terminal performs the measurement of the own cell, and the RLM in the specific resource, the controller 153 generates the individual control information including the measurement resource restriction for the own cell. The controller 153 generates the individual control information including the measurement configuration input from the measurement configuration controller 161. The controller 153 instructs the transmitter 155 to transmit the individual control information. Upon receiving the RRC connection reestablishment request message, the controller 153 outputs the received message to the reconnection controller 163. If the RLF information available flag is included in the RRC connection reestablishment complete message, and set to the true (true), the controller 153 outputs that the terminal holds the RLF information to the RLF controller 165.

The measurement configuration controller 161 of the controller 153 generates the measurement configuration (Measurement Configuration) for the movement control. The measurement configuration includes a measurement object (MeasObject), a report configuration (ReportConfig), a measurement Identifier (MeasID), a filtering parameter (Quantityconfig) of the measurement result report, a measurement gap indicative of a period during which data for measuring another frequency or another system by the terminal is not transmitted or received, and a threshold value (S-measure) of the own cell requiring the measurement start of the neighbor cell. The measurement configuration controller 161 outputs the measurement configuration generated in the controller 153. Upon receiving the terminal information response message including the RLF report, the controller 153 outputs the RLF report to the RLF controller 165.

Upon receiving the RRC connection reestablishment request message, the reconnection controller 163 determines whether the connection of the terminal described in the above message can be reestablished, or not. When the reconnection controller 163 determines that the connection of the above terminal can be reestablished, the reconnection controller 163 generates the RRC connection reestablishment message, and outputs the generated message to the transmitter 155.

Upon being notified that the terminal holds the RLF information, the RLF controller 165 determines whether the RLF information is collected, or not. When the RLF controller 165 determines that the RLF information of the terminal is collected, the RLF controller 165 generates the terminal information request message (UEInformationRequest) in which the RLF report request flag (rlf-ReportReq) is set to the true (true), and outputs the generated message to the transmitter 155. Upon receiving the RLF report, the RLF controller 165 determines whether the measurement result of the own cell included in the above report is the value measured by the measurement resource restriction, or not. The determination method may acquire the measurement configuration from the base station to which the terminal has been connected at the time of the RLF, and perform the determination. Also, if the terminal includes the measurement resource restriction flag, the terminal may perform the determination according to the flag. The RLF controller 165 optimizes the network on the basis of the RLF report. The network may be optimized by sharing the RLF report within the network.

The transmitter 155 transmits the individual control information, the RRC connection reestablishment message, or the terminal information request message to the terminal.

Figure 4:
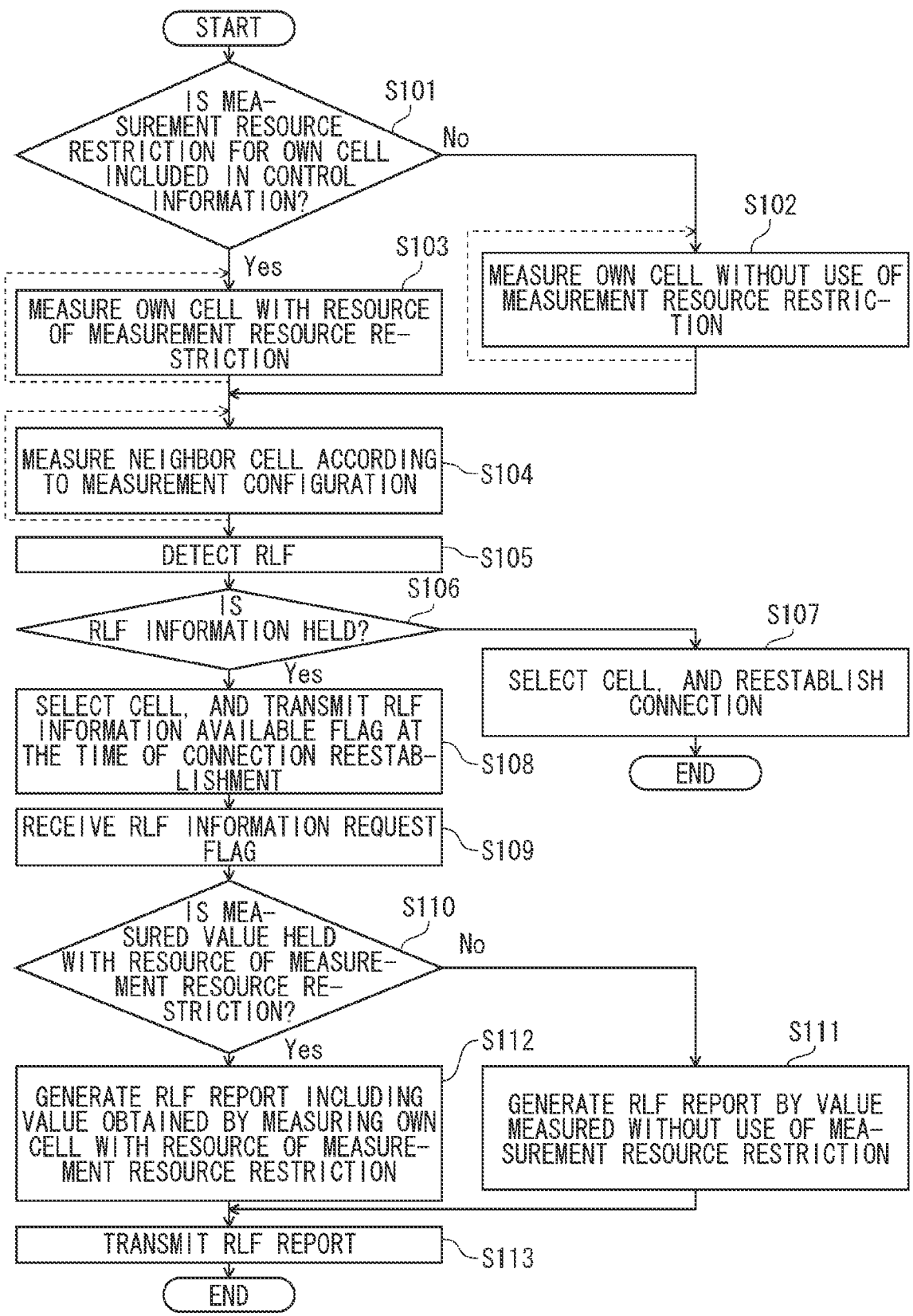
FIG. 4 is a flowchart illustrating an example of the operation of the terminal according to the first embodiment.

Subsequently, the operation of the first embodiment will be described. FIG. 4 is a flowchart illustrating an example of the operation of the terminal according to the first embodiment.

The terminal determines whether the measurement resource restriction for the own cell is included in the individual control information, or not (Step S101). If the measurement resource restriction for the own cell is not included in the individual control information (no), the terminal allows the operation to proceed to Step S102. On the other hand, if the measurement resource restriction for the own cell is included in the individual control information (yes), the terminal allows the operation to proceed to Step S103.

In Step S102, the terminal performs the measurement of the own cell without the use of the measurement resource restriction. The terminal repeats the measurement of the own cell in Step S102 as indicated by a dotted line in the figure, while allowing the operation to proceed to Step S104. In Step S103, the terminal performs the measurement of the own cell with the use of the measurement resource restriction. The terminal repeats the measurement of the own cell in Step S103 as indicated by a dotted line in the figure, while allowing the operation to proceed to Step S104.

In Step S104, the terminal performs the measurement of the neighbor cell according to the measurement configuration. The terminal repeats the measurement of the neighbor cell in Step S104 as indicated by a dotted line in the figure, while allowing the operation to proceed to Step S105. When the terminal detects the RLF in Step S105, the above terminal determines whether the RLF report is available, or not (Step S106). If the terminal determines that the RLF report is available (yes), the terminal allows the operation to proceed to Step S108. On the other hand, if the terminal determines that the RLF information is not available (no), the terminal allows the operation to proceeds to Step S107.

In Step S107, the terminal performs the cell selection, and reestablishes the connection to a suitable cell. If the terminal cannot reestablish the connection to the suitable cell, the terminal becomes in the idle state. In Step S108, the terminal performs the cell selection, and reestablishes the connection to the suitable cell. In this situation, the terminal includes the RLF information available flag set to the true in the RRC connection reestablishment complete message, and transmits the message, and allows the operation to proceeds to Step S109. If the terminal cannot reestablish the connection to the suitable cell, the terminal becomes in the idle state.

In Step S109, the terminal receives the terminal information request message in which the RLF information request flag is set to the true from the base station, and allows the operation to proceed to Step S110. If the terminal does not receive the terminal information request message in which the RLF information request flag is set to the true from the base station, the processing subsequent to Step S109 is not generated.

In Step S110, the terminal determines whether to hold the value measured by the resource of the measurement resource restriction, or not. If the terminal holds the value measured by the resource of the measurement resource restriction (yes), the terminal allows the operation to proceed to Step S112. On the other hand, if the terminal does not hold the value measured by the resource of the measurement resource restriction (not), the terminal allows the operation to proceed to Step S111.

In Step S111, the terminal generates the RLF report by the value measured without the use of the measurement resource restriction, and allows the operation to proceeds to Step S113. In Step S112, the terminal generates the RLF report including the value measured with the use of the measurement resource restriction, and allows the operation to proceed to Step S113. The terminal may include both of the value measured with the use of the measurement resource restriction, and the value measured without the use of the measurement resource restriction in the own cell. The terminal may include only the value measured with the use of the measurement resource restriction in the own cell. Also, in order to report to the base station that the value has been measured with the use of the measurement resource restriction, the terminal may generate the RLF report in which the measurement resource restriction flag is set to the true (true).

In Step S113, the terminal transmits the RLF report to the base station.

As described above, according to this embodiment, the terminal includes the value of the own cell which has been measured with the use of the measurement resource restriction in the RLF report. For that reason, the base station that has received the RLF report can precisely grasp the state of the own cell in which the RLF occurs in the terminal even under the environment in which the ABS is used.

Second Embodiment

A wireless communication system according to a second embodiment will be described with reference to FIGS. 5 to 8. The wireless communication system according to this embodiment is different from that in the first embodiment in that the value measured with the use of the measurement resource restriction as the measured value of the neighbor cell is included in the RLF report. The other configurations are identical with those in the first embodiment, and in FIGS. 6 to 8, the common components or steps with those in the corresponding drawings in the first embodiment are denoted by the same reference symbols.

Figure 5:
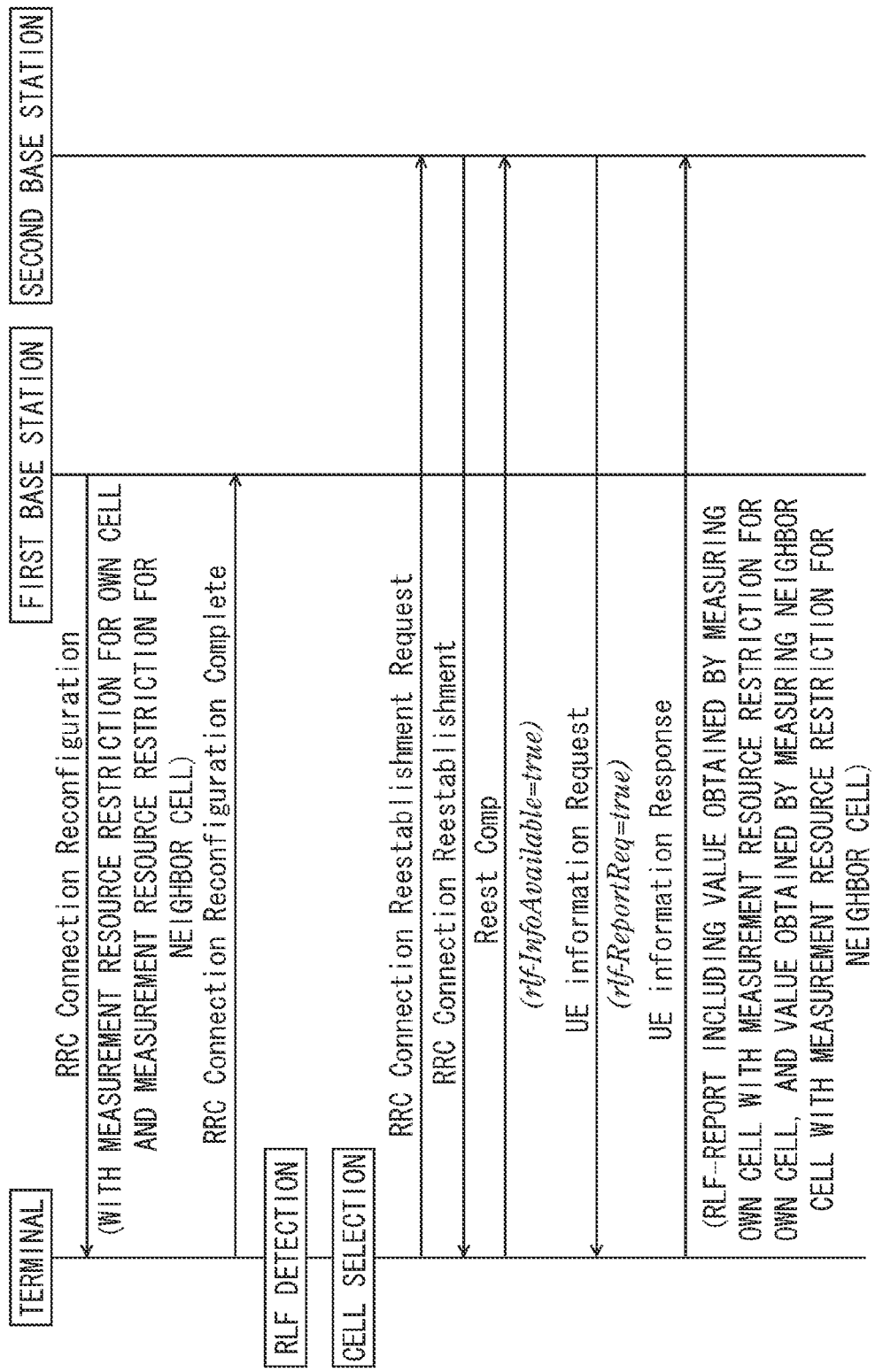
FIG. 5 is a timing chart when a terminal transmits an RLF report in a wireless communication system according to a second embodiment.

FIG. 5 is a timing chart when the terminal transmits the RLF report in the wireless communication system according to the second embodiment. As illustrated in FIG. 5, a base station (first base station) connected with the terminal transmits an RRC connection reconfiguration message (RRC Connection Reconfiguration) to the terminal. The RRC connection reconfiguration message includes control information and a measurement configuration (Measurement Configuration: MC). The control information includes the measurement resource restrictions (Measurement Resource Restriction) for measurement of the own cell and radio link monitoring if the occasion demands. Also, the measurement configuration includes a list of the neighbor cell that applies the measurement resource restriction and the measurement resource restriction if the occasion demands. The measurement resource restriction is set for each of the frequencies. The measurement resource restriction may have a plurality of patterns at one frequency, and attach the neighbor cell list to the respective patterns. With this configuration, a measurement precision of the neighbor cell can be more finely enhanced.

Upon receiving the RRC connection reconfiguration message from the base station, the terminal transmits an RRC connection reconfiguration complete message (RRC Connection Reconfiguration Complete) to the base station. Also, the terminal performs the measurement (Measurement) and the radio link monitoring on the basis of the control information and the measurement configuration from the base station. Upon detecting the radio link failure (RLF), the terminal detects a suitable cell (Suitable Cell) with the use of cell selecting means, and selects the cell. Then, the terminal transmits an RRC connection reestablishment request message (RRC Connection Reestablishment Request) to a base station (second base station) selected by the cell selection.

Upon receiving the RRC connection reestablishment request message from the terminal, the base station determines whether to accept the RRC connection reestablishment request of the terminal, or not. Upon determining to accept the terminal, the base station transmits an RRC connection reestablishment message (RRC Connection Reestablishment) to the terminal. Upon receiving the RRC connection reestablishment message, the terminal generates the RRC connection reestablishment complete message (RRC Connection Reestablishment Complete). If the RLF information related to the radio link failure (RLF) finally generated is available, the terminal includes an RLF information available flag (rlf-InfoAvailable) in the RRC connection reestablishment message, and sets the flag to the true (true). The terminal transmits the RRC connection reestablishment complete message to the base station.

As described above, the terminal completes the RRC connection reestablishment. On the other hand, the base station receives the RRC connection reestablishment complete message in which the RLF information available flag is set to the true (true) from the terminal. The base station determines whether the information from the terminal at the time of the radio link failure is necessary, or not. When the base station determines that the information from the terminal is necessary, the base station transmits the terminal information request message (UEInformationRequest) in which an RLF report request flag (rlf-ReportReq) is set to the true (true) to the terminal in order to request the terminal to transmit the information at the time of radio link failure. The terminal receives the terminal information request message in which the RLF report request flag is set to the true. If the measurement resource restriction (Measurement Resource Restriction) for measurement of the own cell is included in the control information, the terminal generates an RLF report (rlf-Report) including the value obtained by measuring the own cell with the use of the measurement resource restriction. Also, if the measurement resource restriction is included in the measurement configuration, the terminal generates the RLF report (rlf-_Report) including the value obtained by measuring the neighbor cell with the use of the measurement resource restriction. The terminal generates a terminal information response message (UEInformationResponse) including the RLF report, and transmits the generated message to the base station.

The RLF report includes the value obtained by measuring the own cell with the use of the measurement resource restriction in addition to the value obtained by measuring the own cell without use of the measurement resource restriction. Further, the RLF report includes the value obtained by measuring the neighbor cell with the use of the measurement resource restriction, in addition to the value obtained by measuring the neighbor cell without the use of the measurement resource restriction. With this configuration, because the measurement result when the measurement resource restriction is used can be compared with the measurement result when the measurement resource restriction is not used, a gain obtained by using the measurement resource restriction can be calculated, and the network can be optimized.

Also, when the value obtained by measuring the own cell with the use of the measurement resource restriction is included in the RLF report, the value obtained by measuring the own cell without use of the measurement resource restriction may not be included. Further, if the RLF report includes the value obtained by measuring the neighbor cell with the use of the measurement resource restriction, the RLF report may not include the value measured without the use of the measurement resource restriction for the above neighbor cell. With this configuration, because the base station can grasp a state in which the terminal has been actually used, the network can be optimized. Also, as compared with a case in which both of the measurement result of the own cell or the neighbor cell when the measurement resource restriction is not used, and the measurement result of the own cell or the neighbor cell when the measurement resource restriction is used are included in the RLF report, the size of the RLF report can be reduced.

When the value obtained by measuring the own cell or the neighbor cell with the use of the measurement resource restriction is included in the RLF report, that the value is measured by using the measurement resource restriction may be notified with the use of the flag for each cell. The flag may be configured by 1 bit. With this configuration, because the base station can explicitly know that the measurement result is the value measured by using the measurement resource restriction, the base station can easily know that any state has been measured. The RLF report may be generated in distinction between a group of the measurement result measured with the use of the measurement resource restriction, and a group of the measurement result measured without the use of the measurement resource restriction. With this configuration, because only one flag needs to be added as a while without need to add the flag for each of the cells, the size of the message can be reduced. With the exchange of the measurement configuration information between the base stations, the base station may grasp whether the measurement result is the value measured with the use of the measurement resource restriction, or not. With this configuration, the addition of the signaling in the radio resource can be suppressed.

The above description is exemplary, and the RLF report may be transmitted by a technique other than the above technique. For example, the terminal transitions to an idle state (Idle) after having detected the RLF. Thereafter, when the connection is newly established, the RLF information available flag (rlf-InfoAvailable) may be set to the true (true) and included in an RRC connection setup complete message (RRC Connection Setup Complete), and transmitted to the base station. With the above configuration, because the base station can know that the terminal holds the RLF report, the base station transmits the terminal information request message in which the RLF report request (rlf-Reportreq) is set to the true to the terminal, and can obtain the terminal information response message including the RLF report (rlf-report) from the terminal.

In the system described above, the first base station and the second base station may be configured by an identical base station. Also, a destination of the RLF report (rlf-report) from the terminal is not limited to the second base station, but may be another base station with which the terminal can communicate.

Configuration of Terminal According to Second Embodiment

Figure 6:
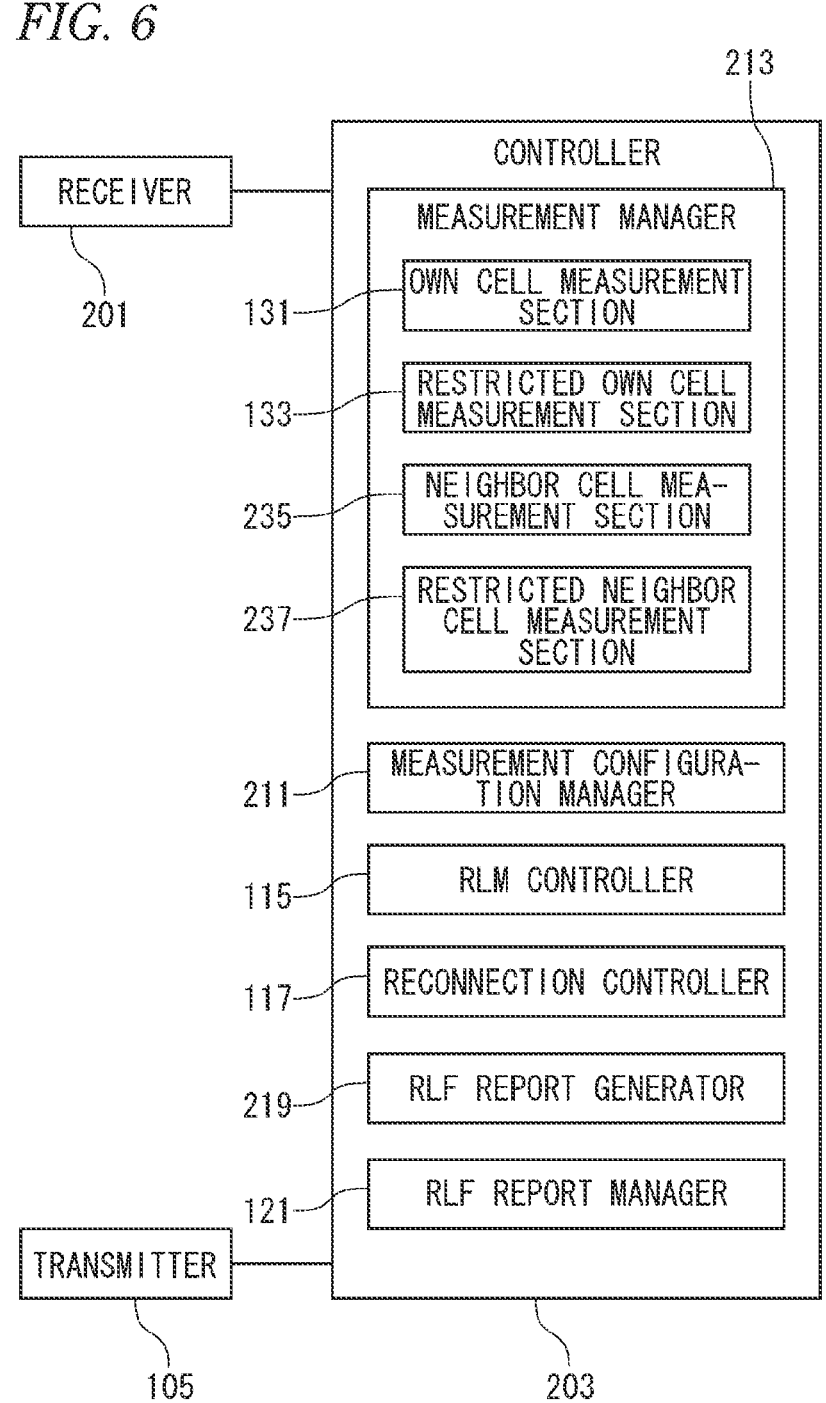
FIG. 6 is a block diagram of the terminal configuring the wireless communication system according to the second embodiment.

FIG. 6 is a block diagram of the terminal configuring the wireless communication system according to the second embodiment. As illustrated in FIG. 6, the terminal according to the second embodiment includes a receiver 201, a controller 203, and a transmitter 105. The terminal according to this embodiment is different from the terminal according to the first embodiment in the receiver 201 as well as a measurement configuration manager 211, a measurement manager 213, and an RLF report generator 219 installed in the controller 203. Also, a neighbor cell measurement section 235 installed in a measurement manager 213 according to this embodiment is different from that of the first embodiment. Further, the measurement manager 213 according to this embodiment has a restricted neighbor cell measurement section 237.

The receiver 201 receives the CRS or the RSSI of the target cell in the specific resource according to an instruction from the restricted neighbor cell measurement section 237 installed in the measurement manager 213 of the controller 203, in addition to the function of the receiver 101 in the first embodiment. The receiver 201 outputs the received CRS or RSSI to the restricted neighbor cell measurement section 237 together with the frequency and the PCI.

The measurement configuration manager 211 outputs the PCI of the own cell, the frequency of the own cell, and the configuration necessary for measurement of the own cell to the own cell measurement section 131. When the measurement resource restriction (Measurement Resource Restriction) for the own cell is input to the measurement configuration manager 211, the measurement configuration manager 211 outputs the measurement resource restriction for the own cell, the PCI of the own cell, the frequency of the own cell, and the information necessary for measurement of the own cell to the restricted own cell measurement section 133.

When the measurement resource restriction is included in the measurement configuration, the measurement configuration manager 211 outputs the target frequency of the measurement resource restriction, the neighbor cell list, and the target measurement configuration included in the measurement configuration to the restricted neighbor cell measurement section 237. On the other hand, when the neighbor cell list is not set in the measurement resource restriction, the measurement configuration manager 211 applies the measurement resource restriction to all of the neighbor cells of that frequency. The measurement configuration manager 211 outputs the configuration necessary for measurement of the neighbor cell included in the measurement configuration to the neighbor cell measurement section 235. If only the value measured with the use of the measurement resource restriction is included in the RLF report as the measured value of the neighbor cell, the measurement configuration manager 211 may output the configuration to the neighbor cell measurement section 235 so as not to measure the target neighbor cell of the measurement resource restriction.

The measurement manager 213 manages the RSRP and the RSRQ of the own cell in distinction between the RSRP and the RSRQ measured without the use of the measurement resource restriction, and the RSRP and the RSRQ measured with the use of the measurement resource restriction. The measurement manager 213 calculates the RSRQ according to the RSRP and the received signal strength indication (Received Signal Strength Indication: RSSI) which have been input from the own cell measurement section 131, and manages the RSRP and the RSRQ as the RSRP and the RSRQ of the own cell which have been measured without the use of the measurement resource restriction. The measurement manager 213 calculates the RSRQ according to the RSRP and the RSSI which have been input from the restricted own cell measurement section 133, and manages the RSRP and the RSRQ as the RSRP and the RSRQ of the own cell which have been measured with the use of the measurement resource restriction.

The measurement manager 213 manages the RSRP and the RSRQ of the neighbor cell for each PCI and each frequency. When the measurement manager 213 determines that the measurement of the neighbor cell is necessary, according to the managed value and measurement configuration, the measurement manager 213 instructs the neighbor cell measurement section 235 to measure the neighbor cell. The measurement manager 213 manages the RSRP and the RSRQ of the neighbor cell in distinction between the RSRP and the RSRQ measured without the use of the measurement resource restriction, and the RSRP and the RSRQ measured with the use of the measurement resource restriction. The measurement manager 213 calculates the RSRQ of the cell having the PCI of the above frequency according to the RSRP, the RSSI, the PCI, and the frequency which have been input from the neighbor cell measurement section 235, and manages the RSRP and the RSRQ as the RSRP and the RSRQ measured without the use of the measurement resource restriction of the cell having the PCI of the above frequency. In the same frequency, a common value may be used in the RSSI of the own cell and the neighbor cell, which has been measured without the use of the measurement resource restriction.

In the RSSI of the own cell, a common value may be used between the RSSI of the own cell measured without being restricted to the specific resource, and the RSSI of the own cell measured with the use of the measurement resource restriction. The measurement manager 213 calculates the RSRQ of the cell having the PCI of the above frequency according to the RSRP, the RSSI, the PCI, and the frequency which have been input from the restricted neighbor cell measurement section 237, and manages the RSRP and the RSRQ as the RSRP and the RSRQ measured with the use of the measurement resource restriction of the cell having the PCI of the above frequency. Upon receiving an instruction for outputting the held information from the RLF report generator 219, the measurement manager 213 outputs the held RSRP and the RSQR of the respective cells to the RLF report generator 219. In this situation, if the RSRP or the RSRQ which has been measured with the use of the measurement resource restriction is present in the own cell or the neighbor cell, the measurement manager 213 also outputs the above information to the RLF report generator 219. However, because the measurement of the RSRQ is not essential, the own cell measurement section 131, the restricted own cell measurement section 133, the neighbor cell measurement section 235, and the restricted neighbor cell measurement section 237 may not input the RSSI to the measurement manager 213. Therefore, the measurement manager 213 may output only the RSRP of a part or all of the cells, which is output to the RLF report generator 219, to the RLF report generator 219.

The neighbor cell measurement section 235 may have a function that does not perform the measurement of the neighbor cell instructed not to be measured from the measurement manager 213, in addition to the function of the neighbor cell measurement section 135 according to the first embodiment.

The restricted neighbor cell measurement section 237 measures the RSRP or the RSSI of all the cells of the above frequency if the cell included in the input neighbor cell list or the neighbor cell list is not input, with the use of the measurement resource restriction in the target frequency of the measurement resource restriction input from the measurement configuration manager 211. Therefore, the restricted neighbor cell measurement section 237 instructs the receiver 201 to measure the CRS or the RSSI of the own cell in the resource instructed with the measurement resource restriction. The restricted neighbor cell measurement section 237 performs the layer 3 filtering on the CRS or the RSSI input from the receiver 201, and outputs the calculated RSRP or RSSI to the measurement manager 213 together with the frequency and the PCI.

Upon receiving an instruction for generating the RLF report from the reconnection controller 117, the RLF report generator 219 instructs the measurement manager 213 to output the held information. The RLF report generator 219 generates the RLF report on the basis of the information input from the measurement manager 213. The RLF report includes the RSRP or the RSRQ of the own cell which has been measured without the use of the measurement resource restriction of the own cell, the RSRP or the RSRQ of the own cell which has been measured with the use of the measurement resource restriction of the own cell, the RSRP or the RSRQ of the neighbor cell which has been measured without the use of the measurement resource restriction, or the RSRP or the RSRQ of the neighbor cell which has been measured with the use of the measurement resource restriction. With this configuration, the measurement result when the measurement resource restriction is used can be compared with the measurement result when the measurement resource restriction is not used. As a result, the gain obtained by using the measurement resource restriction can be calculated, and the network can be optimized.

When the value obtained by measuring the own cell with the use of the measurement resource restriction is included, the RLF report generator 219 may not include the value obtained by measuring the own cell without the use of the measurement resource restriction. Further, when the value obtained by measuring the neighbor cell with the use of the measurement resource restriction is included, the RLF report generator 219 may not include the value obtained by measuring the neighbor cell without the use of the measurement resource restriction. With the above configuration, because the state in which the terminal has been actually used can be grasped by the base station, the network can be optimized. Also, as compared with a case in which both of the measurement result of the own cell or the neighbor cell when the measurement resource restriction is not used, and the measurement result of the own cell or the neighbor cell when the measurement resource restriction is used are included in the RLF report, the size of the RLF report can be reduced.

When the RSRP or the RSRQ which has been measured with the use of the measurement resource restriction is included in the RLF report, the RLF report generator 219 may set the measurement resource restriction flag to the true (true) for each of the cells. The measurement resource restriction flag may be configured by 1 bit. With the above configuration, because the base station can explicitly know that the measurement result is the value measured with the use of the measurement resource restriction, the base station can easily know that any state has been measured. The RLF report generator 219 may generate the RLF report in distinction between a group of the measurement result measured with the use of the measurement resource restriction, and a group of the measurement result measured without the use of the measurement resource restriction. With this configuration, because only one flag needs to be added as a while without need to add the flag for each of the cells, the size of the message can be reduced. When the base station can know whether the measurement result is the value obtained by using the measurement resource restriction through the network, or not, by another method, the measurement resource restriction flag is not included in the message configuration. When the RLF report generator 219 generates the RLF report, the RLF report generator 219 outputs that the RLF report has been generated to the reconnection controller 117, and outputs the RLF report to the RLF report manager 121.

Configuration of Base Station According to Second Embodiment

Figure 7:
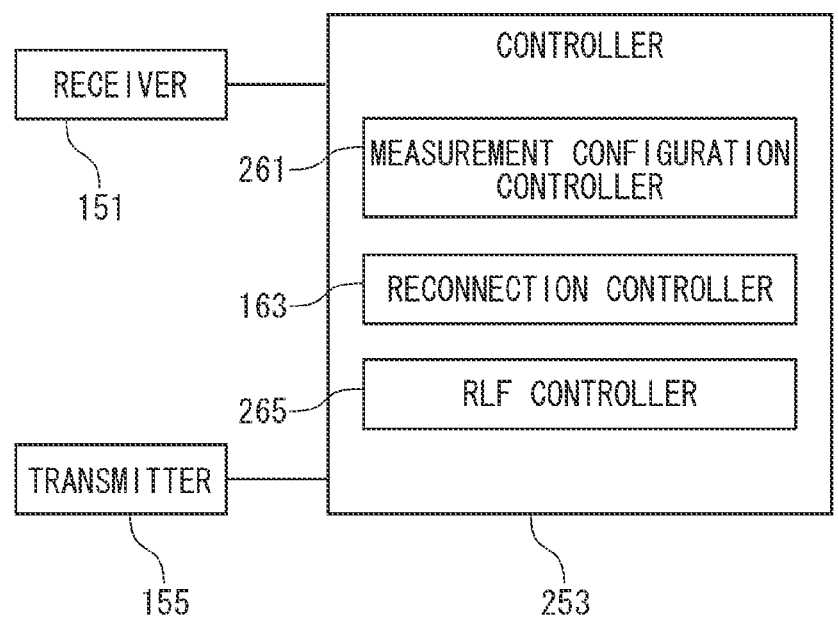
FIG. 7 is a block diagram of a base station configuring the wireless communication system according to the second embodiment.

FIG. 7 is a block diagram of the base station configuring the wireless communication system according to the second embodiment. As illustrated in FIG. 7, the base station according to the second embodiment includes the receiver 151, a controller 253, and the transmitter 155. The base station according to this embodiment is different from the base station according to the first embodiment in a measurement configuration controller 261 and an RLF controller 265 provided in the controller 253.

The measurement configuration controller 261 of the controller 253 has a function of including the measurement resource restriction in the measurement configuration in addition to the function of the measurement configuration controller 161 according to the first embodiment. The measurement resource restriction configures the neighbor cell list to be subjected to the measurement resource restriction, which is included in the measurement target together. When all of the cells to be measured are measured by the measurement resource restriction, the neighbor cell list is not included. The measurement resource restriction may be included in not the measurement target, but the report configuration, or may be associated with the measurement identifier. Further, the measurement resource restriction may have a plurality of patterns at not each frequency but one frequency, and attach the neighbor cell list to the respective patterns.

In addition to the function of the RLF controller 165 according to the first embodiment, the RLF controller 265 has a function of determining whether the measurement result of the neighbor cell included in the above report is the measurement resource restriction, or not, upon receiving the RLF report. The determination method may acquire the measurement configuration from base station to which the terminal has been connected at the time of the RLF for determination, may perform the determination by the flag if the terminal includes the measurement resource restriction flag for each of the cells, or may perform the determination by groups if the values measured with the use of the measurement resource restriction and the values measured without the use of the measurement resource restriction are classified into the groups.

Figure 8:
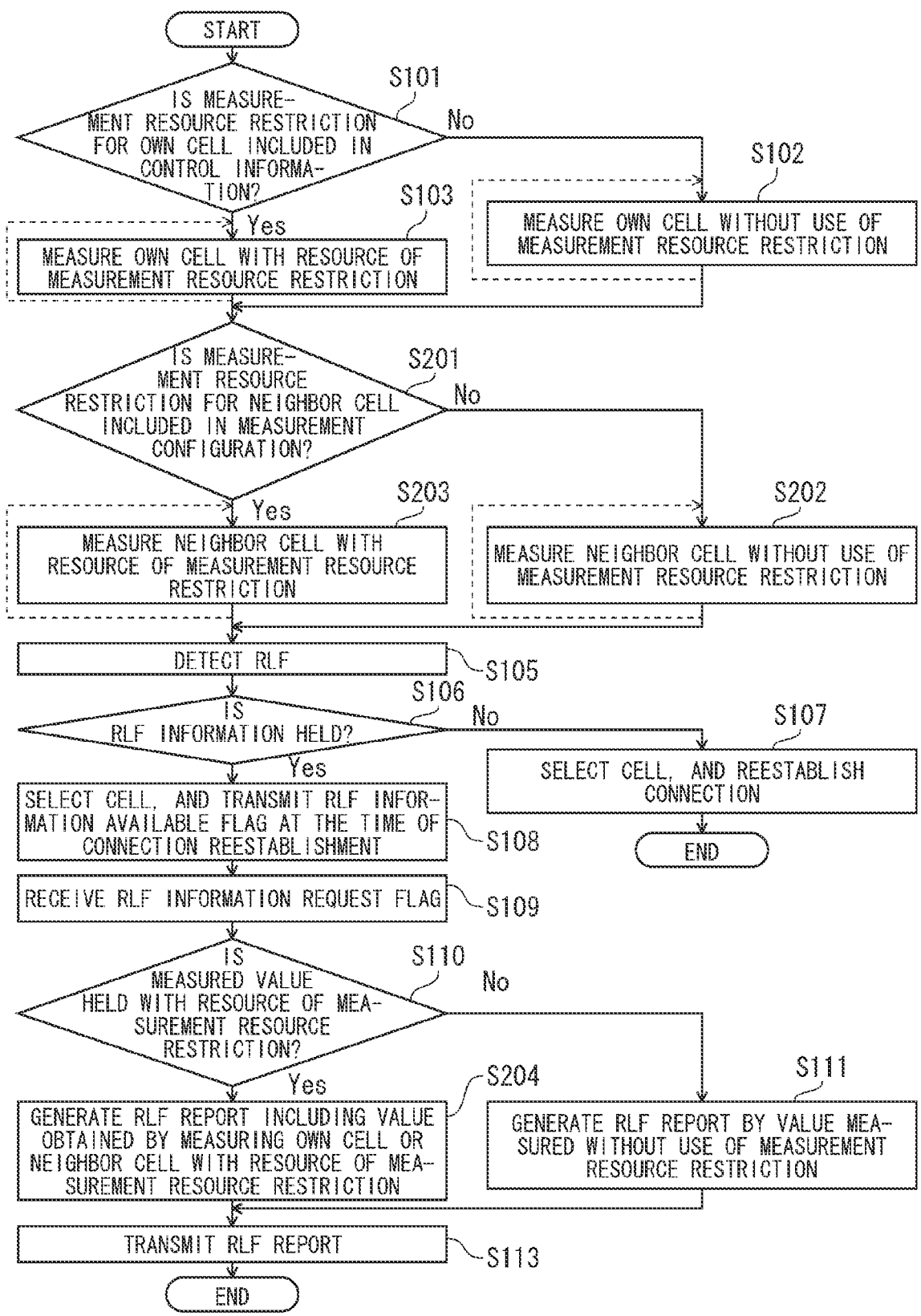
FIG. 8 is a flowchart illustrating an example of the operation of the terminal according to the second embodiment.

Subsequently, the operation of the terminal according to the second embodiment will be described. FIG. 8 is a flowchart illustrating an example of the operation of the terminal according to the second embodiment. In the flowchart illustrated in FIG. 8, Steps S201 to S203 are performed instead of Step S104 in the flowchart according to the first embodiment illustrated in FIG. 4, and Step S204 is performed instead of Step S112.

In Step S102, the measurement of the own cell is performed without using the measurement resource restriction. The terminal repeats the measurement of the own cell in Step S102 as indicated by a dotted line in the figure, while allowing the operation to proceed to Step S201. In Step S103, the terminal performs the measurement of the own cell with the use of the measurement resource restriction. The terminal repeats the measurement of the own cell in Step S103 as indicated by a dotted line in the figure, while allowing the operation to proceed to Step S201.

In Step S201, the terminal determines whether the measurement resource restriction for the neighbor cell is included in the measurement configuration, or not. If the measurement resource restriction for the neighbor cell is not included in the measurement configuration (no), the operation proceeds to Step S202. On the other hand, if the measurement resource restriction for the neighbor cell is included in the measurement configuration (yes), the operation proceeds to Step S203.

In Step S202, the terminal performs the measurement of the neighbor cell without the use of the measurement resource restriction. The terminal repeats the measurement of the neighbor cell in Step S202 as indicated by a dotted line in the figure, while allowing the operation to proceed to Step S105. In Step S203, the terminal performs the measurement of the cell included in the neighbor cell list with the use of the measurement resource restriction. If the neighbor cell list is not included, the terminal measures all of the cells of the frequency in which the measurement resource restriction is configured with the use of the measurement resource restriction. The terminal repeats the measurement of the neighbor cell in Step S203 as indicated by a dotted line in the figure, while allowing the operation to proceed to Step S105.

In Step S110, if the terminal determines to hold the value measured by the resource of the measurement resource restriction (yes), the terminal allows the operation to proceed to Step S204.

In Step S204, the terminal generates the RLF report with the inclusion of the value measured with the use of the measurement resource restriction, and allows the operation to proceeds to Step S113. The terminal may include both of the value measured with the use of the measurement resource restriction, and the value measured without the use of the measurement resource restriction for the own cell or the neighbor cell. If the terminal includes the value measured with the use of the measurement resource restriction for the own cell or the neighbor cell, the terminal may not include the value measured without the use of the measurement resource restriction. Also, in order to report to the base station that the value has been measured with the use of the measurement resource restriction, the terminal may generate the RLF report in which the measurement resource restriction flag is included for each of the cells, and set to the true (true). The measurement resource restriction flag may be configured by 1 bit.

As described above, according to this embodiment, the terminal includes the value of the own cell and the value of the neighbor cell, which have been measured with the use of the measurement resource restriction in the RLF report. For that reason, the base station that has received the RLF report can precisely grasp the states of the own cell and the neighbor cell in which the RLF occurs in the terminal even under the environment in which the ABS is used.

Third Embodiment

A wireless communication system according to a third embodiment will be described with reference to FIGS. 9 to 11. The wireless communication system according to this embodiment is different from that in the first embodiment in that the value measured with the use of the measurement resource restriction as the measured value of the neighbor cell is included in the RLF report. Therefore, in the wireless communication system according to the third embodiment, the operation of parts of the components of the terminal is different from that in the first embodiment. The other configurations are identical with those in the first embodiment, and in FIGS. 10 to 11, the common components or steps with those in the corresponding drawings in the first embodiment are denoted by the same reference symbols.

Figure 9:
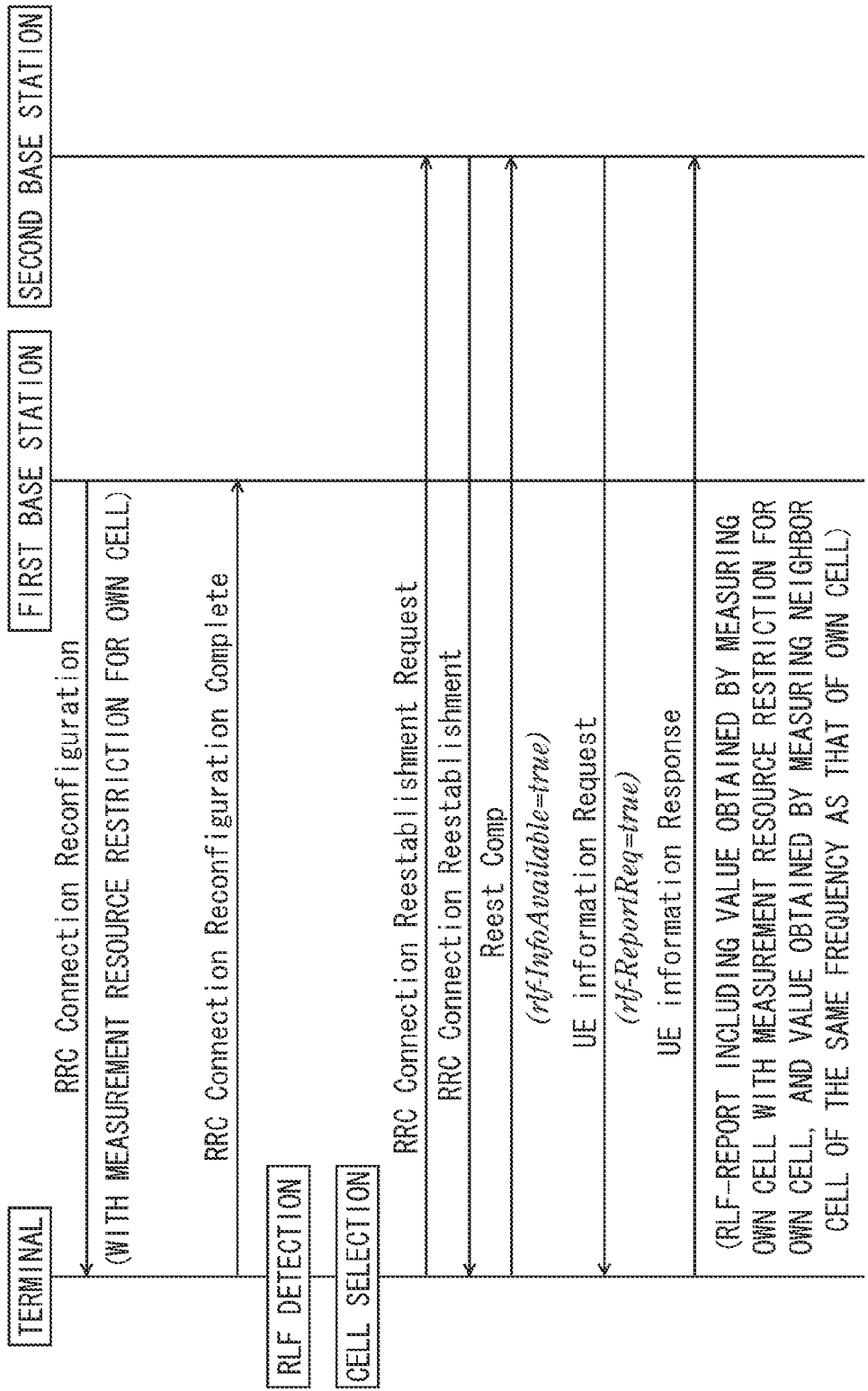
FIG. 9 is a timing chart when a terminal transmits an RLF report in a wireless communication system according to a third embodiment.

FIG. 9 is a timing chart when the terminal transmits the RLF report in the wireless communication system according to the third embodiment. As illustrated in FIG. 9, a base station (first base station) connected with the terminal transmits an RRC connection reconfiguration message (RRC Connection Reconfiguration) to the terminal. The RRC connection reconfiguration message includes control information and a measurement configuration (Measurement Configuration: MC). The control information includes the measurement resource restrictions (Measurement Resource Restriction) for measurement of the own cell and radio link monitoring if the occasion demands.

Upon receiving the RRC connection reconfiguration message from the base station, the terminal transmits an RRC connection reconfiguration complete message (RRC Connection Reconfiguration Complete) to the base station. Also, the terminal performs the measurement (Measurement) and the radio link monitoring on the basis of the control information and the measurement configuration from the base station. If the measurement resource restriction for the own cell is included in the control information, the terminal measures the neighbor cells of the same frequency with the use of the measurement resource restriction. Upon detecting the radio link failure (RLF), the terminal detects a suitable cell (Suitable Cell) with the use of cell selecting means, and selects the detected cell. Then, the terminal transmits an RRC connection reestablishment request message (RRC Connection Reestablishment Request) to a base station (second base station) selected by the cell selection.

Upon receiving the RRC connection reestablishment request message from the terminal, the base station determines whether to accept the RRC connection reestablishment request of the terminal, or not. Upon determining to accept the terminal, the base station transmits an RRC connection reestablishment message (RRC Connection Reestablishment) to the terminal. Upon receiving the RRC connection reestablishment message, the terminal generates the RRC connection reestablishment complete message (RRC Connection Reestablishment Complete). If the RLF information related to the radio link failure (RLF) finally generated is available, the terminal includes an RLF information available flag (rlf-InfoAvailable) in the RRC connection reestablishment message, and sets the flag to the true (true). The terminal transmits the RRC connection reestablishment complete message to the base station.

As described above, the terminal completes the RRC connection reestablishment. On the other hand, the base station receives the RRC connection reestablishment complete message in which the RLF information available flag is set to the true (true) from the terminal. The base station determines whether the information from the terminal at the time of the radio link failure is necessary, or not. When the base station determines that the information from the terminal is necessary, the base station transmits the terminal information request message (UEInformationRequest) in which an RLF report request flag (rlf-ReportReq) is set to the true (true) to the terminal in order to request the terminal to transmit the information at the time of radio link failure. The terminal receives the terminal information request message in which the RLF report request flag is set to the true. If the measurement resource restriction (Measurement Resource Restriction) for measurement of the own cell is included in the control information, the terminal generates an RLF report (rlf-Report) including the value obtained by measuring the own cell with the use of the measurement resource restriction, and the value of the neighbor cell of the same frequency measured with the use of the measurement resource restriction. The terminal generates a terminal information response message (UEInformationResponse) including the RLF report, and transmits the generated message to the base station. With the above configuration, because the neighbor cell is measured at a timing when measuring the own cell, the state of the neighbor cell at the timing when measuring the own cell can be grasped. Therefore, the state in which the RLF occurs can be more grasped.

The RLF report includes the value obtained by measuring the own cell with the use of the measurement resource restriction in addition to the value obtained by measuring the own cell without use of the measurement resource restriction. Further, the RLF report includes the value obtained by measuring the neighbor cell with the use of the measurement resource restriction, in addition to the value obtained by measuring the neighbor cell without the use of the measurement resource restriction. With this configuration, because the measurement result when the measurement resource restriction is used can be compared with the measurement result when the measurement resource restriction is not used, a gain obtained by using the measurement resource restriction can be calculated, and the network can be optimized.

Also, when the value obtained by measuring the own cell with the use of the measurement resource restriction is included in the RLF report, the value obtained by measuring the own cell without use of the measurement resource restriction may not be included. Further, if the RLF report includes the value obtained by measuring the neighbor cell with the use of the measurement resource restriction, the RLF report may not include the value measured without the use of the measurement resource restriction for the above neighbor cell. With this configuration, because the base station can grasp a state in which the terminal has been actually used, the network can be optimized. Also, as compared with a case in which both of the measurement result of the own cell or the neighbor cell when the measurement resource restriction is not used, and the measurement result of the own cell or the neighbor cell when the measurement resource restriction is used are included in the RLF report, the size of the RLF report can be reduced.

When the value obtained by measuring the own cell or the neighbor cell with the use of the measurement resource restriction is included in the RLF report, that the value is measured by using the measurement resource restriction may be notified with the use of the flag for each cell. The flag may be configured by 1 bit. With this configuration, because the base station can explicitly know that the measurement result is the value measured by using the measurement resource restriction, the base station can easily know that any state has been measured. The RLF report may be generated in distinction between a group of the measurement result measured with the use of the measurement resource restriction, and a group of the measurement result measured without the use of the measurement resource restriction. With this configuration, because only one flag needs to be added as a while without need to add the flag for each of the cells, the size of the message can be reduced. With the exchange of the measurement configuration information between the base stations, the base station may grasp whether the measurement result is the value measured with the use of the measurement resource restriction, or not. With this configuration, the addition of the signaling in the radio resource can be suppressed.

The above description is exemplary, and the RLF report may be transmitted by a technique other than the above technique. For example, the terminal transitions to an idle state (Idle) after having detected the RLF. Thereafter, when the connection is newly established, the RLF information available flag (rlf-InfoAvailable) may be set to the true (true) and included in an RRC connection setup complete message (RRC Connection Setup Complete), and transmitted to the base station. With the above configuration, because the base station can know that the terminal holds the RLF report, the base station transmits the terminal information request message in which the RLF report request (rlf-Reportreq) is set to the true to the terminal, and can obtain the terminal information response message including the RLF report (rlf-report) from the terminal.

In the system described above, the first base station and the second base station may be configured by an identical base station. Also, a destination of the RLF report (rlf-report) from the terminal is not limited to the second base station, but may be another base station with which the terminal can communicate.

Configuration of Terminal According to Third Embodiment

Figure 10:
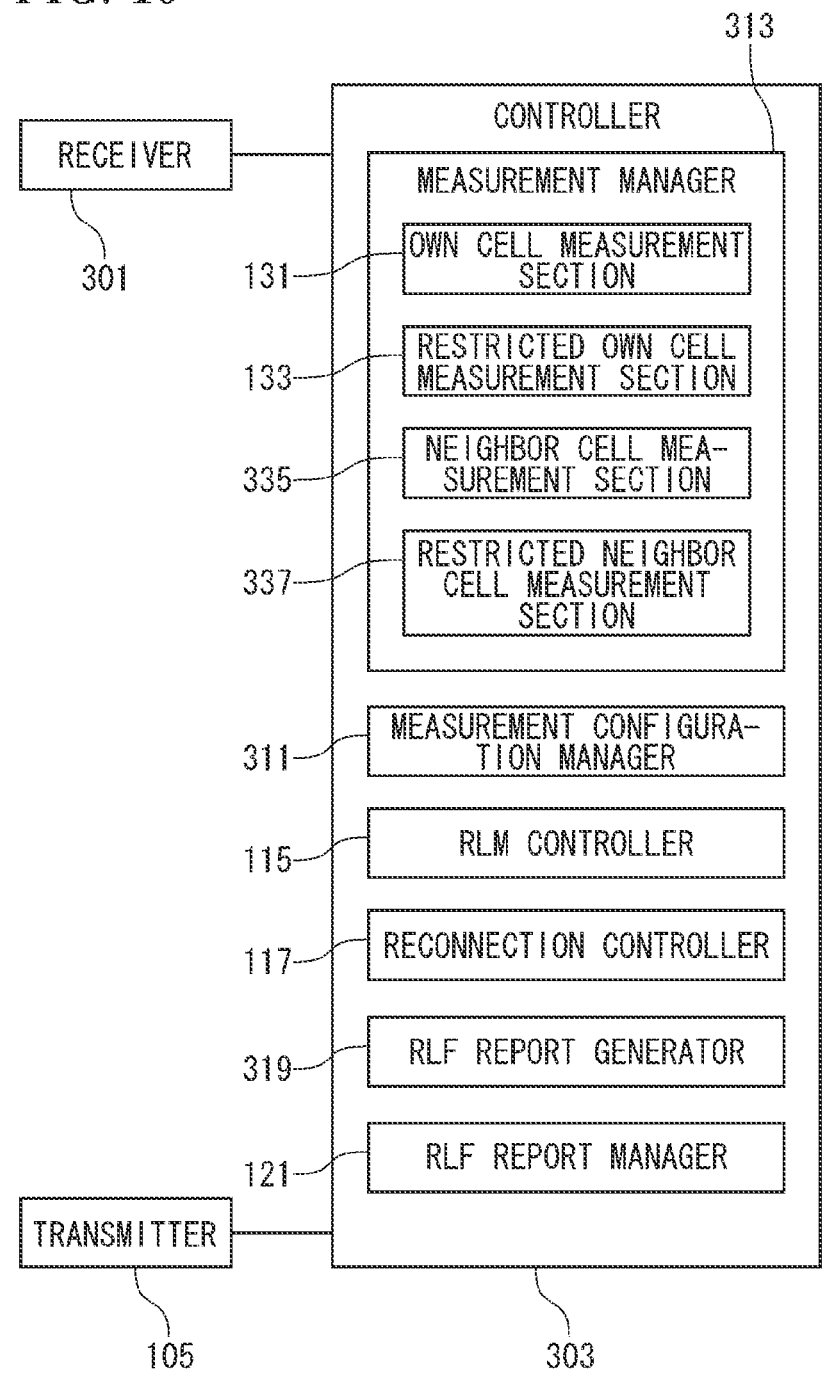
FIG. 10 is a block diagram of the terminal configuring the wireless communication system according to the third embodiment.
Figure 11:
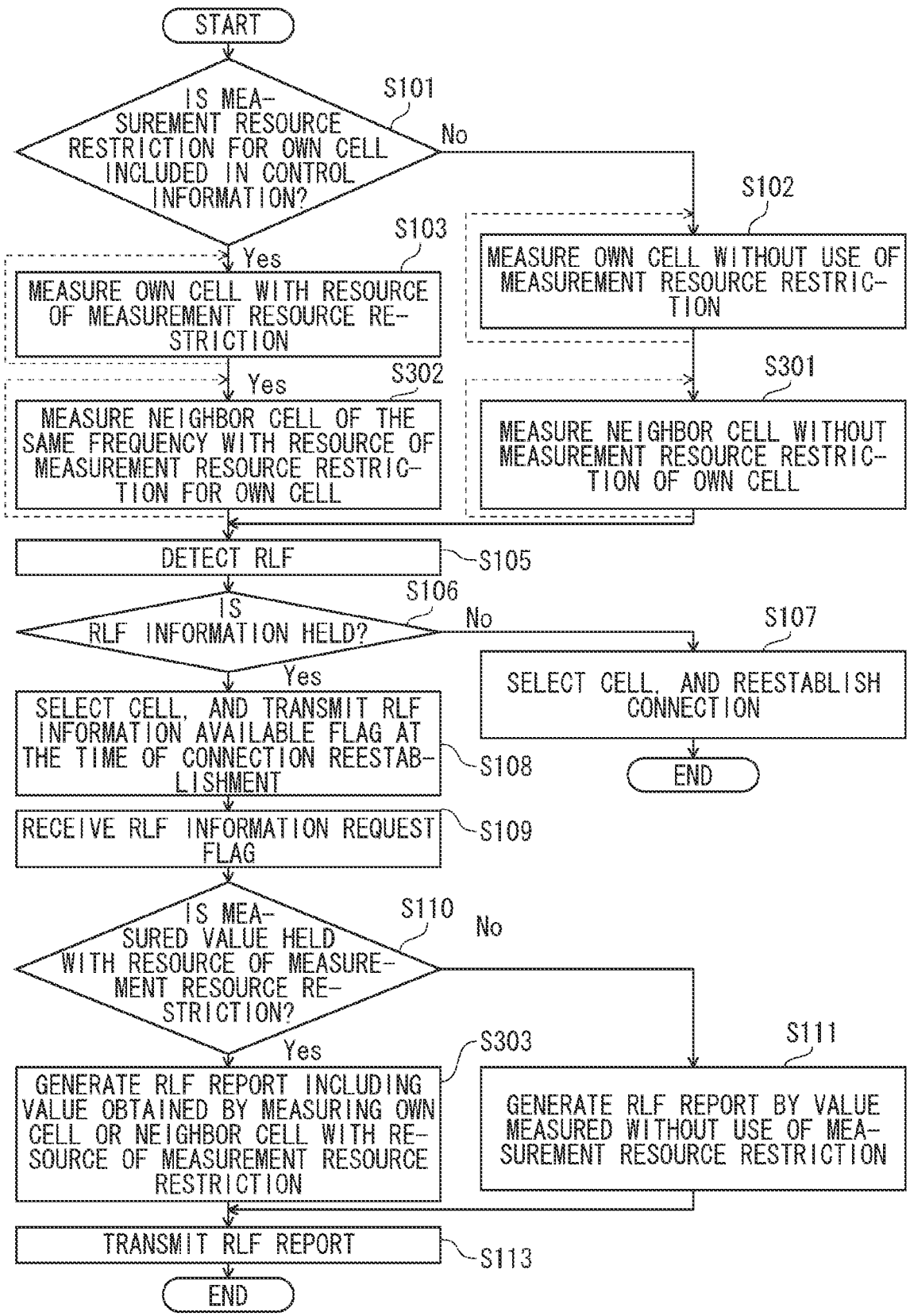
FIG. 11 is a flowchart illustrating an example of the operation of the terminal according to the third embodiment.
Figure 12:
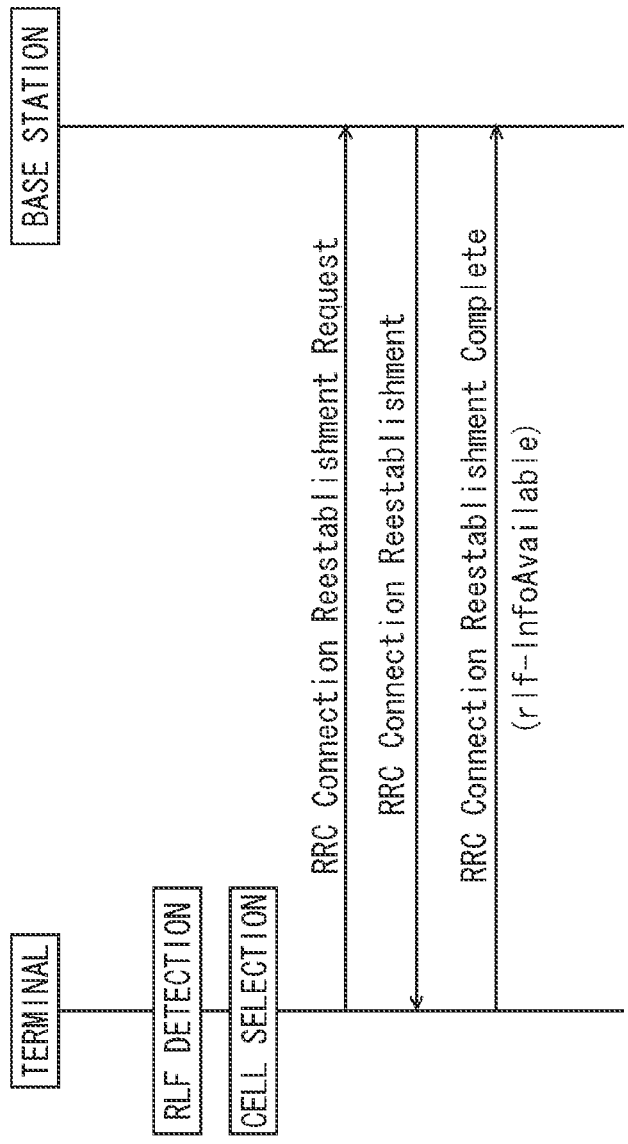
FIG. 12 is a timing chart when the terminal reestablishes the RRC connection.
Figure 13:
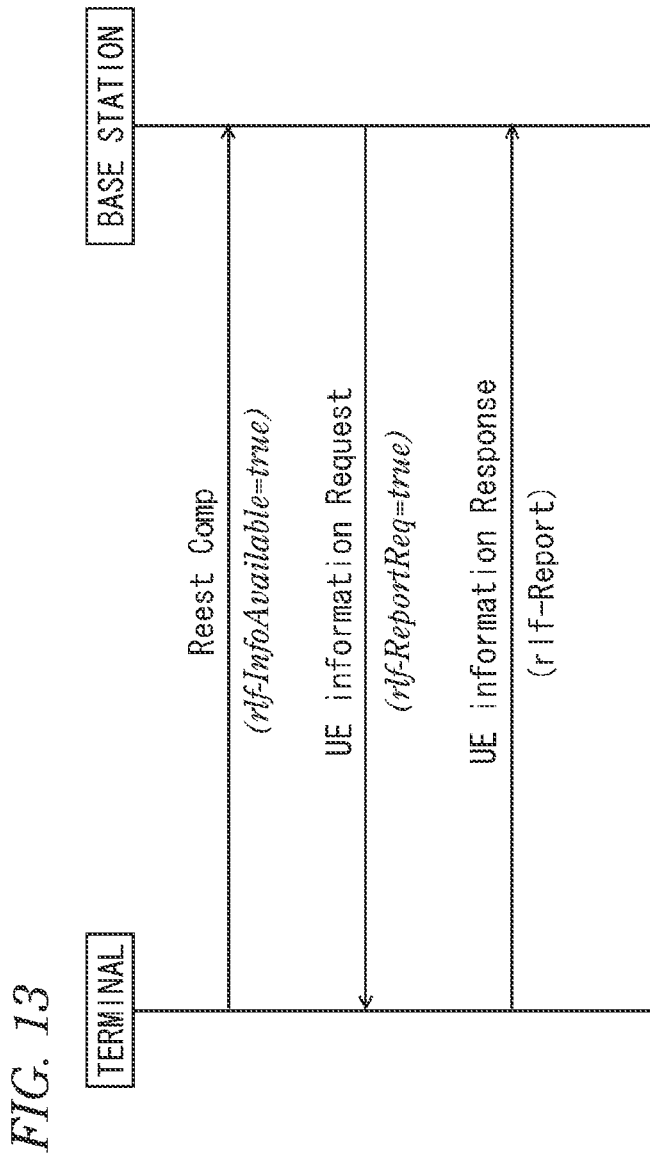
FIG. 13 is a timing chart illustrating an example in which the terminal provides information at the time of the radio link failure to the base station.
Figure 15A:
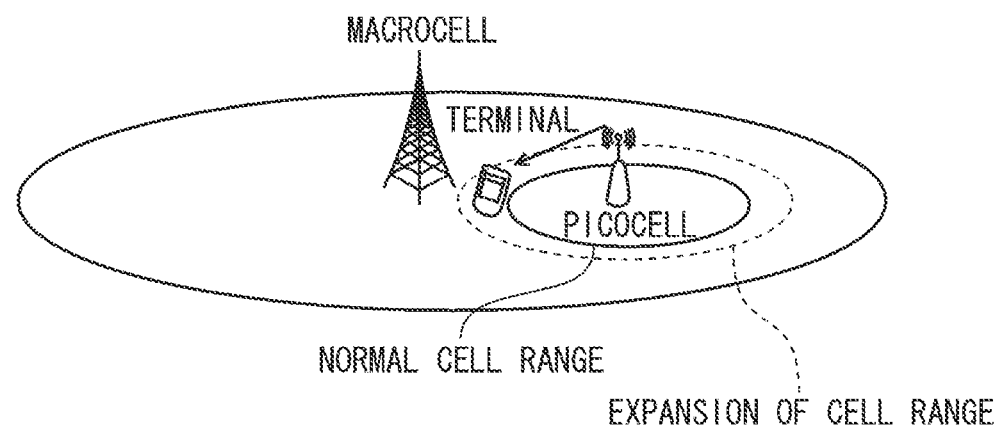
FIGS. 15A and 15B are diagrams illustrating an example in which the ABS is used.
Figure 15B:
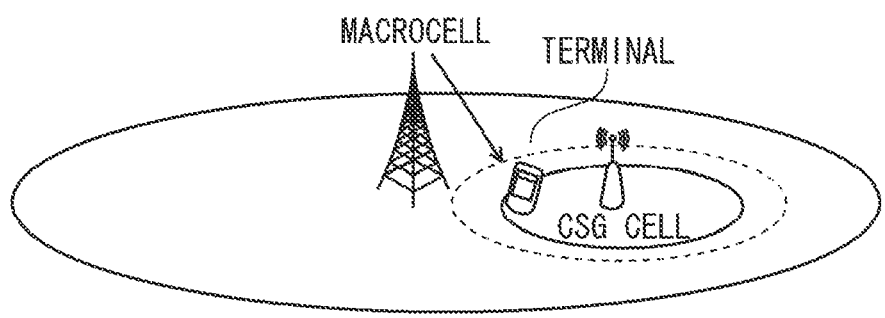

FIG. 10 is a block diagram of the terminal configuring the wireless communication system according to the third embodiment. As illustrated in FIG. 10, the terminal according to the third embodiment includes a receiver 301, a controller 303, and a transmitter 105. The terminal according to this embodiment is different from the terminal according to the first embodiment in the receiver 301 as well as a measurement configuration manager 311, a measurement manager 313, and an RLF report generator 319 installed in the controller 303. Also, a neighbor cell measurement section 335 installed in a measurement manager 313 according to this embodiment is different from that of the first embodiment. Further, the measurement manager 313 according to this embodiment has a restricted neighbor cell measurement section 337.

The receiver 301 receives the CRS or the RSSI of the neighbor cell having the same frequency as that of the own cell in the specific resource according to an instruction from the restricted neighbor cell measurement section 337 installed in the measurement manager 313 of the controller 303, in addition to the function of the receiver 101 in the first embodiment. The receiver 301 outputs the received CRS or RSSI to the restricted neighbor cell measurement section 337 together with the frequency and the PCI.

The measurement configuration manager 311 has a function of outputting the configuration related to the frequency of the measurement resource restriction to the restricted neighbor cell measurement section 337 among the configurations necessary for measurement of the neighbor cell included in the measurement configuration when the measurement resource restriction for the own cell is input, in addition to the function of the measurement configuration manager 111 in the first embodiment.

The measurement manager 313 manages the RSRP and the RSRQ of the own cell in distinction between the RSRP and the RSRQ measured without the use of the measurement resource restriction, and the RSRP and the RSRQ measured with the use of the measurement resource restriction. The measurement manager 313 calculates the RSRQ according to the RSRP and the received signal strength indication (Received Signal Strength Indication: RSSI) which have been input from the own cell measurement section 131, and manages the RSRP and the RSRQ as the RSRP and the RSRQ of the own cell which have been measured without the use of the measurement resource restriction. The measurement manager 313 calculates the RSRQ according to the RSRP and the RSSI which have been input from the restricted own cell measurement section 133, and manages the RSRP and the RSRQ as the RSRP and the RSRQ of the own cell which have been measured with the use of the measurement resource restriction.

The measurement manager 313 manages the RSRP and the RSRQ of the neighbor cell for each PCI of the neighbor cells, and each frequency. When the measurement manager 313 determines that the measurement of the neighbor cell is necessary, according to the managed value and measurement configuration, the measurement manager 313 instructs the neighbor cell measurement section 335 to measure the neighbor cell. The measurement manager 313 manages the RSRP and the RSRQ of the neighbor cell in distinction between the RSRP and the RSRQ measured without the use of the measurement resource restriction for the own cell, and the RSRP and the RSRQ measured with the use of the measurement resource restriction for the own cell. The measurement manager 313 calculates the RSRQ of the cell having the PCI of the above frequency according to the RSRP, the RSSI, the PCI, and the frequency which have been input from the neighbor cell measurement section 335, and manages the RSRP and the RSRQ as the RSRP and the RSRQ measured without the use of the measurement resource restriction for the own cell of the cell having the PCI of the above frequency. In the same frequency, a common value may be used in the RSSI of the own cell and the neighbor cell, which has been measured without the use of the measurement resource restriction. In the RSSI of the own cell, a common value may be used between the RSSI of the own cell measured without being restricted to the specific resource, and the RSSI of the own cell measured with the use of the measurement resource restriction.

The measurement manager 313 calculates the RSRQ of the cell having the PCI of the above frequency according to the RSRP, the RSSI, the PCI, and the frequency which have been input from the restricted neighbor cell measurement section 337, and manages the RSRP and the RSRQ as the RSRP and the RSRQ measured with the use of the measurement resource restriction for the own cell of the cell having the PCI of the above frequency. Upon receiving an instruction for outputting the held information from the RLF report generator 319, the measurement manager 313 outputs the held RSRP and the RSQR of the respective cells to the RLF report generator 319. In this situation, if the RSRP or the RSRQ which has been measured with the use of the measurement resource restriction is present in the own cell or the neighbor cell, the measurement manager 313 also outputs the above information to the RLF report generator 319. However, because the measurement of the RSRQ is not essential, the own cell measurement section 131, the restricted own cell measurement section 133, the neighbor cell measurement section 335, and the restricted neighbor cell measurement section 337 may not input the RSSI to the measurement manager 313. Therefore, the measurement manager 313 may output only the RSRP of a part or all of the cells, which is output to the RLF report generator 319, to the RLF report generator 319.

The neighbor cell measurement section 335 may have a function that does not perform the measurement of the same frequency as that of the own cell, in addition to the function of the neighbor cell measurement section 135 according to the first embodiment.

In order to measure the RSRP and the RSSI of the neighbor cell with the use of the measurement resource restriction in the frequency to be subjected to the measurement resource restriction input from the measurement configuration manager 311, the restricted neighbor cell measurement section 337 instructs the receiver 301 to measure the CRS or the RSSI in the resource instructed by the measurement resource restriction. The restricted neighbor cell measurement section 337 subjects the CRS or RSSI input from the receiver 301 to the layer 3 filtering, and outputs the calculated RSRP or RSSI to the measurement manager 313 together with the frequency and the PCI.

Upon receiving an instruction for generating the RLF report from the reconnection controller 117, the RLF report generator 319 instructs the measurement manager 313 to output the held information. The RLF report generator 319 generates the RLF report on the basis of the information input from the measurement manager 313. The RLF report includes the RSRP or the RSRQ of the own cell or the neighbor cell which has been measured without the use of the measurement resource restriction of the own cell, or the RSRP or the RSRQ of the own cell or the neighbor cell which has been measured with the use of the measurement resource restriction of the own cell. With this configuration, the measurement result when the measurement resource restriction for the own cell is used can be compared with the measurement result when the measurement resource restriction for the own cell is not used. As a result, the gain obtained by using the measurement resource restriction for the own cell can be calculated, and the network can be optimized.

When the value obtained by measuring the own cell or the neighbor cell with the use of the measurement resource restriction for the own cell is included, the RLF report generator 319 may not include the value of the own cell or the neighbor cell which has been measured without the use of the measurement resource restriction for the own cell. Further, when the value obtained by measuring the neighbor cell with the use of the measurement resource restriction for the own cell is included, the RLF report generator 319 may not include the value obtained by measuring the neighbor cell without the use of the measurement resource restriction for the own cell. With the above configuration, because the state in which the terminal has been actually used can be grasped by the base station, the network can be optimized. Also, as compared with a case in which both of the measurement result of the own cell or the neighbor cell when the measurement resource restriction for the own cell is not used, and the measurement result of the own cell or the neighbor cell when the measurement resource restriction for the own cell is used are included in the RLF report, the size of the RLF report can be reduced.

When the RSRP or the RSRQ which has been measured with the use of the measurement resource restriction for the own cell is included in the RLF report, the RLF report generator 319 may set the measurement resource restriction flag to the true (true) for each of the cells. With the above configuration, because the base station can explicitly know that the measurement result is the value measured with the use of the measurement resource restriction for the own cell, the base station can easily know that any state has been measured. The RLF report generator 319 may generate the RLF report in distinction between a group of the measurement result measured with the use of the measurement resource restriction for the own cell, and a group of the measurement result measured without the use of the measurement resource restriction for the own cell. With this configuration, because only one flag needs to be added as a while without need to add the flag for each of the cells, the size of the message can be reduced. When the base station can know whether the measurement result is the value obtained by using the measurement resource restriction through the network, or not, by another method, the measurement resource restriction flag is not included in the message configuration. When the RLF report generator 319 generates the RLF report, the RLF report generator 319 outputs that the RLF report has been generated to the reconnection controller 117, and outputs the RLF report to the RLF report manager 121.

Subsequently, the operation of the terminal according to the third embodiment will be described. FIG. 11 is a flowchart illustrating an example of the operation of the terminal according to the third embodiment. In the flowchart illustrated in FIG. 11, Steps S301 to S303 are performed instead of Step S104 in the flowchart according to the first embodiment illustrated in FIG. 4, and Step S303 is performed instead of Step S112.

In Step S102, the measurement of the own cell is performed without using the measurement resource restriction. The terminal repeats the measurement of the own cell in Step S102 as indicated by a dotted line in the figure, while allowing the operation to proceed to Step S301. In Step S103, the terminal performs the measurement of the own cell with the use of the measurement resource restriction. The terminal repeats the measurement of the own cell in Step S103 as indicated by a dotted line in the figure, while allowing the operation to proceed to Step S302.

In Step S301, the terminal performs the measurement of the neighbor cell without the use of the measurement resource restriction for the own cell according to the measurement configuration. The terminal repeats the measurement of the neighbor cell in Step S301 as indicated by a dotted line in the figure, while allowing the operation to proceed to Step S105.

In Step S302, the terminal performs the measurement of the neighbor cell having the same frequency as that of the own cell with the use of the measurement resource restriction for the own cell according to the measurement configuration. In this step, in the neighbor cell of the frequency different from that of the own cell, the terminal measures the neighbor cell according to the measurement configuration without the use of the measurement resource restriction for the own cell. The terminal repeats the measurement of the neighbor cell in Step S302 as indicated by a dotted line in the figure while allowing the operation to proceed to Step S105.

In Step S110, if the terminal determines to hold the value measured by the resource of the measurement resource restriction (yes), the terminal allows the operation to proceed to Step S303.

In Step S303, the terminal generates the RLF report with the inclusion of the value measured with the use of the measurement resource restriction for the own cell, and allows the operation to proceeds to Step S113. The terminal may include both of the value measured with the use of the measurement resource restriction, and the value measured without the use of the measurement resource restriction for the own cell or the neighbor cell. If the terminal includes the value measured with the use of the measurement resource restriction for the own cell or the neighbor cell, the terminal may not include the value measured without the use of the measurement resource restriction of the neighbor cell. Also, in order to report to the base station that the value has been measured with the use of the measurement resource restriction, the terminal may generate the RLF report in which the measurement resource restriction flag is included for each of the cells, and set to the true (true). The measurement resource restriction flag may be configured by 1 bit.

As described above, according to this embodiment, the terminal includes the values of the own cell and the neighbor cell, which have been measured with the use of the measurement resource restriction for the own cell in the RLF report. For that reason, the base station that has received the RLF report can grasp the state of the neighbor cell in the above terminal at timing when the terminal measures the own cell, and therefore can more precisely grasp the state under the ABS environment.

Fourth Embodiment

As described above, a precision in the measurement is different between a value measured in a subframe of the ABS and a value measured in the subframe which is not the ABS under the circumstance where the ABS is used. For that reason, in the conventional MDT (Minimization Drive Test), the precision with which the base station grasps the state of the terminal may be degraded. An object of the present invention according to the fourth embodiment of the present invention is to provide a wireless communication terminal, a wireless communication base station, a wireless communication system, and a reporting method, in which an external device can precisely grasp the state of the respective cells in the wireless communication terminal even under the environment where the ABS is used.

The wireless communication system according to the fourth embodiment will be described with reference to FIGS. 16 to 20. The wireless communication system according to the fourth embodiment includes the terminal and the base station described before the description of the first embodiment. The terminal has a function of receiving a reference signal transmitted from the base station in downlink for each of the cells, logging the measurement result derived on the basis of a given calculation expression, and transmitting the logged measurement result to the base station. Each base station performs the allocation and management of the radio resources (for example, frequency band in a frequency domain or a time domain) to the respective terminals. Further, the base station has a function of an access point of the wireless access network for the terminal.

Figure 16:
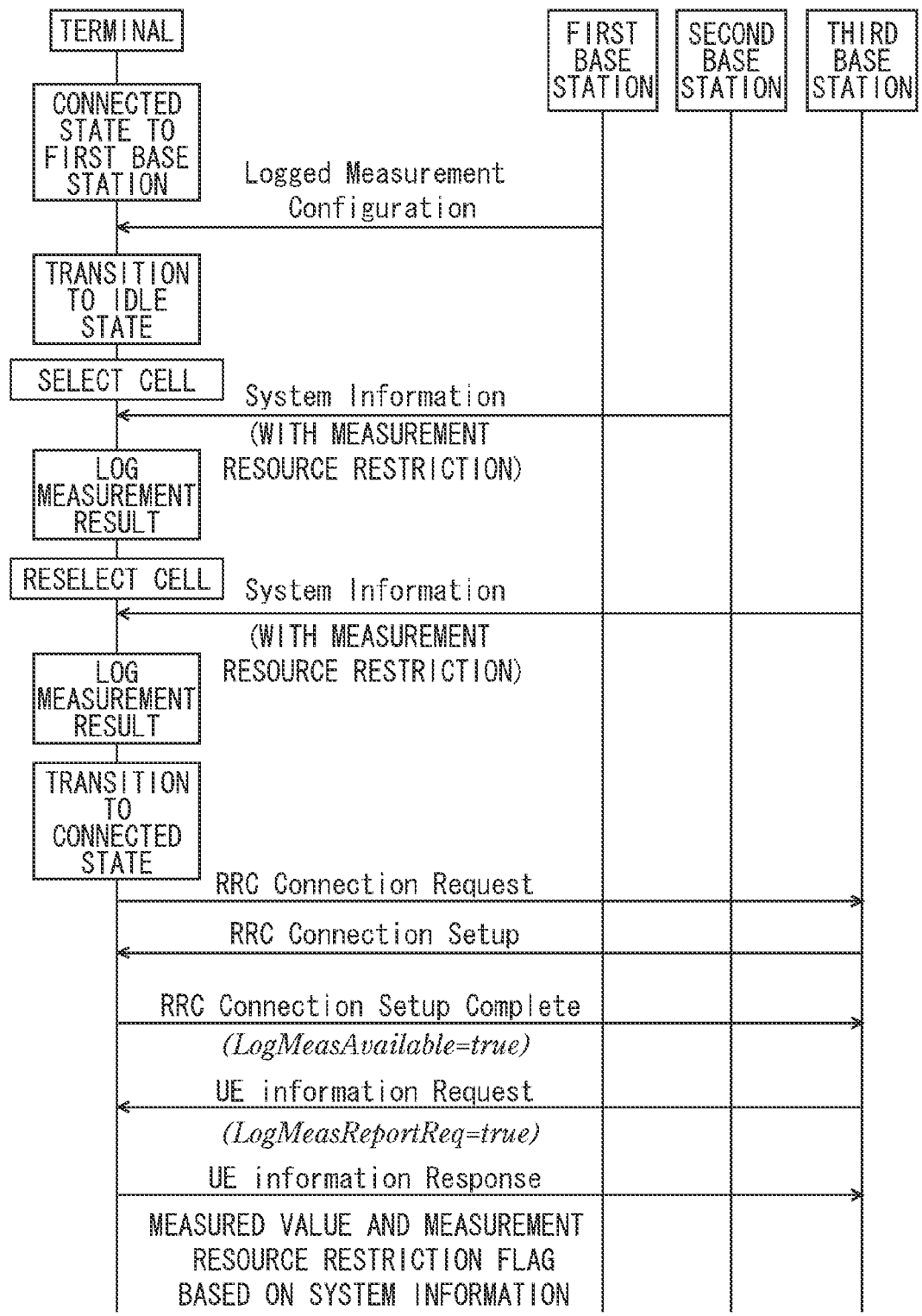
FIG. 16 is a timing chart when a terminal transmits a logged measurement report in a wireless communication system according to a fourth embodiment.

FIG. 16 is a timing chart when a terminal transmits a logged measurement report (LogMeasReport) in the wireless communication system according to the fourth embodiment. As illustrated in FIG. 16, the base station (first base station) connected with the terminal transmits a logged measurement configuration (Logged Measurement Configuration) to the terminal. The logged measurement configuration includes configuration information for logging the measurement result when the terminal is in an idle state. The logged measurement configuration includes, specifically, a present time (absoluteTimeInfo), a logging duration (loggingDuration), a logging interval (loggingInterval), a trace reference (traceReference), a trace recording session (traceRecordingSession), and a target area configuration (AreaConfiguration).

The terminal transitions to the idle state, and then performs the cell selection. The terminal starts to log the measurement result on the basis of the logged measurement configuration of the selected cell. When system information (System Information) received from a cell coming under the control of the second base station includes the measurement resource restriction (Measurement Resource Restriction) for the own cell, the terminal measures the own cell on the basis of the measurement resource restriction. Then, the terminal logs the measurement result on the basis of the logged measurement configuration. In this situation, the terminal logs that the measurement result has been measured on the basis of the measurement resource restriction together. Also, the terminal performs cell reselection (Cell Reselection) to be connected, on the basis of the measurement results of the own cell and the neighbor cell.

Upon reselecting the cell coming under the control of the third base station, the terminal receives the system information (System Information) from the cell. If the system information includes the measurement resource restriction for the own cell, the terminal measures the own cell on the basis of the measurement resource restriction. Then, the terminal logs the measurement result on the basis of the logged measurement configuration. The terminal logs that the measurement result has been measured on the basis of the measurement resource restriction together. If the measurement resource restriction is not included, the terminal performs a normal measurement. Then, the terminal logs the measurement result on the basis of the logged measurement configuration.

When the terminal transitions to a connected state, the terminal transmits the RRC connection request (RRC Connection Request) message to the third base station. Then, the third base station transmits an RRC connection setup (RRC Connection Setup) message to the terminal. When the terminal receives the RRC connection setup message, and completes a setup, the terminal transmits the RRC connection setup complete (RRC Connection Setup Complete) message. In this situation, if the terminal holds the logged measurement result based on the logged measurement configuration, the terminal transmits the RRC connection setup complete message in which a logged measurement available (log MeasAvailable) flag is set to the true (true).

When the third base station receives the RRC connection setup complete message in which the logged measurement available flag is set to the true, and determines that the logged measurement result is necessary, the third base station transmits the terminal information request (UE Information Request) message to the terminal. The third base station sets the logged measurement request (logMeasReportReq) flag of the terminal information request (UE Information Request) message to the true (true), and transmits the message to the terminal. When the terminal receives the terminal information request message in which the logged measurement request flag is set to the true, the terminal includes the held logged measurement result in the terminal information response (UE Information Response) message, and transmits the message to the third base station. The logged measurement result included in the terminal information response is "logged measurement report". In this situation, the terminal sets a flag (measurement resource restriction flag) indicative of whether the logged measurement result is the value measured on the basis of the measurement resource restriction, or not, for each of the cells. If the logged measurement result is the value measured on the basis of the measurement resource restriction, the terminal sets the measurement resource restriction flag to the true (true). On the other hand, if the logged measurement result is the value not measured on the basis of the measurement resource restriction, the terminal does not set the measurement resource restriction flag.

With the above operation, the base station can determine whether the logged measurement result received from the terminal is the value measured on the basis of the measurement resource restriction, or not. For that reason, according to this embodiment, the state of the cell can be more precisely grasped than the conventional art.

The terminal may start to log the measurement result since the terminal transitions to the idle state.

The above description is exemplary, and the terminal may notify the base station that the logged measurement result is available through a method other than the above method. For example, the terminal may set the logged measurement available flag of the RRC connection reconfiguration (RRC Connection Reconfiguration complete) message at the time of the handover to the true (true), and transmits the message. Also, the terminal may set the logged measurement available flag of the RRC connection reestablishment Complete (RRC Connection Re-establishment Complete) message to the true (true), and transmits the message.

In the system described above, the first base station, the second base station, and the third station may be configured by an identical base station. Also, a destination of the logged measurement result from the terminal is not limited to the third base station, but may be another base station with which the terminal can communicate.

Configuration of Terminal According to Fourth Embodiment

Figure 17:
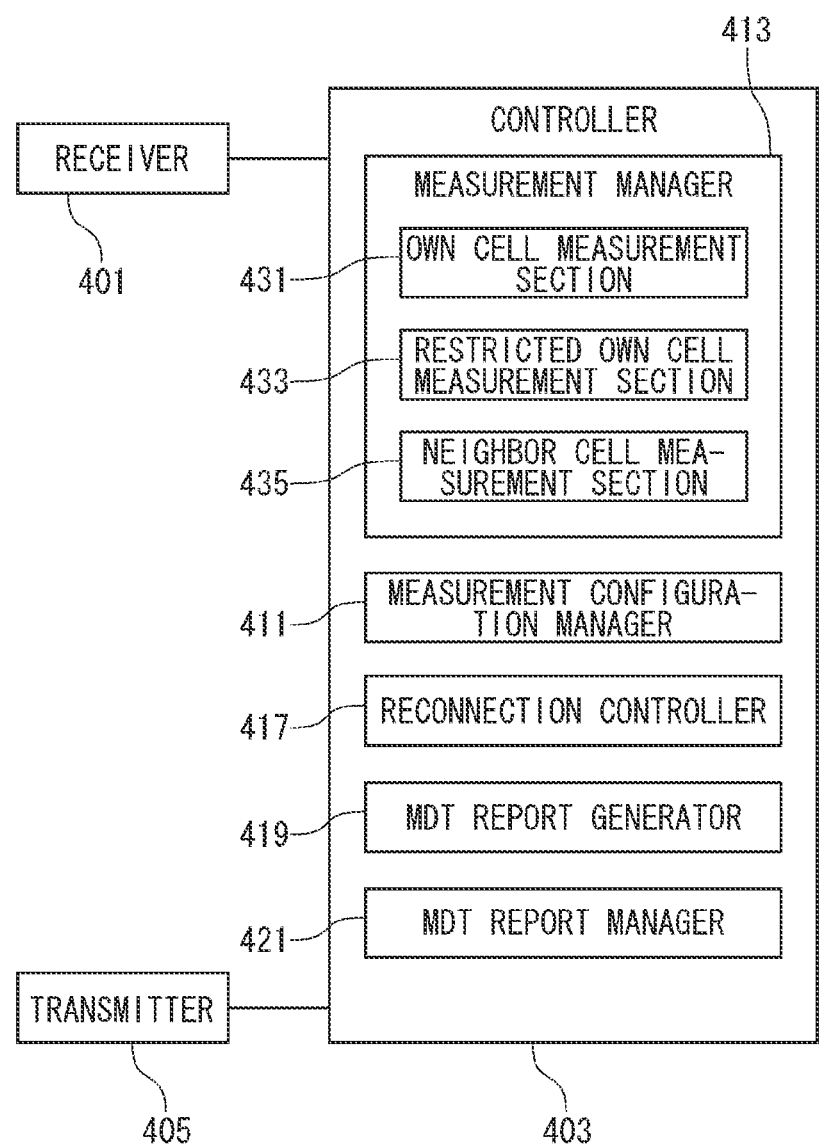
FIG. 17 is a block diagram of the terminal configuring the wireless communication system according to the fourth embodiment.

FIG. 17 is a block diagram of the terminal configuring the wireless communication system according to the fourth embodiment. As illustrated in FIG. 17, the terminal according to the fourth embodiment includes a receiver 401, a controller 403, and a transmitter 405. The controller 403 includes a measurement configuration manager 411, a measurement manager 413, a connection controller 417, an MDT report generator 419, and an MDT report manager 421. Also, the measurement manager 413 includes an own cell measurement section 431, a restricted own cell measurement section 433, and a neighbor cell measurement section 435.

The receiver 401 receives the system information or the individual control information through a downlink of the cell that is being used by the terminal according to an instruction from the controller 403. The receiver 401 outputs the received system information and individual control information to the controller 403.

The receiver 401 receives a cell specific reference signal (CRS) or a received signal strong indication (RSSI) of the own cell according to an instruction from the own cell measurement section 431 installed in the measurement manager 413 of the controller 403. The receiver 401 outputs the received CRS or RSSI to the own cell measurement section 431. Also, the receiver 401 receives the CRS or RSSI of the own cell in the specific resource according to an instruction from the restricted own cell measurement section 433 installed in the measurement manager 413 of the controller 403. The receiver 401 outputs the received CRS or RSSI to the restricted own cell measurement section 433.

The controller 403 outputs the measurement resource restriction information of the own cell, a physical cell identifier (PCI) of the own cell, a frequency of the own cell, information necessary for measurement of the own cell, information necessary for the cell selection, and the information necessary for cell reselection to the measurement configuration manager 411 from the system information received by the receiver 401. The controller 403 outputs the information necessary for the cell selection, and the information necessary for the cell reselection to the connection controller 417. Also, the controller 403, outputs the RRC connection setup message to the connection controller 417.

The controller 403 outputs a logged measurement configuration (Logged Measurement Configuration), which is one of the individual control information, to the MDT report manager 421. Also, the controller 403 outputs a PLMN (Public Land Mobile Network) of the cell connected with the terminal to the MDT report manager 421. Also, when the controller 403 receives the terminal information request message (UEInformationRequest) in which the logged measurement request flag is set to the true (true) in the individual control information, the controller 403 instructs the MDT report manager 421 to perform the logged measurement report.

When the measurement resource restriction for the own cell is input to the measurement configuration manager 411, the measurement configuration manager 411 outputs information necessary for the measurement resource restriction for the own cell, the PCI of the own cell, the frequency of the own cell, and the measurement of the own cell to the restricted own cell measurement section 433. On the other hand, when the measurement resource restriction for the own cell is not input to the measurement configuration manager 411, the measurement configuration manager 411 outputs information necessary for the PCI of the own cell, the frequency of the own cell, and the measurement of the own cell to the own cell measurement section 431. The measurement configuration manager 411 outputs the information necessary for the cell selection and the information necessary for the cell reselection to the measurement manager 413.

The measurement manager 413 manages the RSRP and the RSRQ of the own cell in distinction between the RSRP and the RSRQ measured without the use of the measurement resource restriction, and the RSRP and the RSRQ measured with the use of the measurement resource restriction. The measurement manager 413 calculates the RSRQ according to the RSRP and the RSSI which have been input from the own cell measurement section 431, and manages the RSRP and the RSRQ as the RSRP and the RSRQ of the own cell which have been measured without the use of the measurement resource restriction. The measurement manager 413 calculates the RSRQ according to the RSRP and the RSSI which have been input from the restricted own cell measurement section 433, and manages the RSRP and the RSRQ as the RSRP and the RSRQ of the own cell which have been measured with the use of the measurement resource restriction. When the measurement manager 413 determines that the measurement of the neighbor cell is necessary, according to the managed values, the information necessary for the cell selection, and the information necessary for the cell reselection, the measurement manager 413 instructs the neighbor cell measurement section 435 to measure the neighbor cell. The measurement manager 413 calculates the RSRQ having the PCI of the above frequency according to the RSRP, the RSSI, the PCI, and the frequency which have been input from the neighbor cell measurement section 435, and manages the RSRP and the RSSI.

In the same frequency, a common value may be used in the RSSI of the own cell and the neighbor cell, which has been measured without being restricted to the specific resource. Also, in the RSSI of the own cell, a common value may be used between the RSSI of the own cell measured without being restricted to the specific resource, and the RSSI of the own cell measured with the use of the measurement resource restriction.

Upon receiving an instruction for outputting the measurement result from the MDT report manager 421 to the MDT report generator 419, the measurement manager 413 outputs the measurement result of the own cell and the measurement result of the neighbor cell, which have been managed, to the MDT report generator 419. In this situation, if the measurement results of the own cell are the RSRP and the RSRQ of the own cell which have been measured with the use of the measurement resource restriction, the measurement manager 413 outputs the value measured with the use of the measurement resource restriction to the MDT report generator 419 together.

The measurement manager 413 receives the information from the own cell measurement section 431, the restricted own cell measurement section 433, or the neighbor cell measurement section 435, updates the managed information, and thereafter outputs the updated information to the connection controller 417.

In order to measure the RSRP or the RSSI of the cell having the PCI of the frequency input from the measurement configuration manager 411, the own cell measurement section 431 instructs the receiver 401 to measure the CRS or the RSSI. In order to remove an influence of fading from the value of the CRS or the RSSI which has been input from the receiver 401, the own cell measurement section 431 performs layer 3 filtering on the value input from the receiver 401, and outputs the calculated RSRP or RSSI to the measurement manager 413.

In order to measure the RSRP or RSSI of the cell having the PCI of the input frequency in the resource instructed in the measurement resource restriction for the own cell which has been input from the measurement configuration manager 411, the restricted own cell measurement section 433 instructs the receiver 401 to measure the CRS or the RSSI in the above resource. The restricted own cell measurement section 433 performs the layer 3 filtering on the CRS or RSSI input from the receiver 401, and outputs the calculated RSRP or RSSI to the measurement manager 413.

Upon receiving an instruction for measurement of the neighbor cell from the measurement manager 413, in order to measure the RSRP or RSSI of the cell having the frequency instructed in the measurement configuration, the neighbor cell measurement section 435 instructs the receiver 401 to measure the CRS or the RSSI. The neighbor cell measurement section 435 receives the frequency, the PCI and the CRS, or the RSSI from the receiver 401. The neighbor cell measurement section 435 performs the layer 3 filtering for each of the cells having the PCI of the above frequency, and outputs the calculated RSRP or RSSI to the measurement manager 413 together with the frequency and the PCI.

The connection controller 417 selects or reselects the cell to be connected, on the basis of the information input from the measurement manager 413. When the connection controller 417 determines that the terminal transitions to a connected state, the connection controller 417 generates the RRC connection request message, and outputs the generated message to the transmitter 405. Upon receiving the RRC connection setup message, the connection controller 417 generates the RRC connection setup complete message. In this situation, the connection controller 417 inquires of the MDT report manager 421 about whether to hold the logged measurement result to be reported, or not. Upon receiving a response that the logged measurement result is available from the MDT report manager 421, the connection controller 417 generates the RRC connection setup complete message in which the logged measurement available flag is set to the true, and outputs the generated message to the transmitter 405.

The MDT report manager 421 instructs the measurement manager to output the measurement result managed in the measurement manager to the MDT report generator 419 on the basis of the logged measurement configuration. Only when the PLMN of the cell connected with the terminal matches the RPLMN (Registered PLMN), the MDT report manager 421 instructs the measurement manager 413 to output the managed measurement result to the MDT report generator 419. Upon receiving an inquiry about whether the logged measurement result is available, or not, from the connection controller 417, the MDT report manager 421 confirms whether the measurement result report is present in the MDT report generator 419, or not. If the measurement result report is present in the MDT report generator 419, the MDT report manager 421 returns a response that the measurement result report is available. Upon receiving an instruction for transmitting the logged measurement report from the controller 403, the MDT report manager 421 instructs the MDT report generator 419 to output the logged measurement report. The MDT report manager 421 generates the terminal information response message including the logged measurement report output from the MDT report generator 419, and outputs the generated message to the transmitter 405.

The MDT report generator 419 generates the logged measurement report including the logged measurement configuration, the value input from the measurement manager 413, the measured time, and the position information. In this situation, if the measurement result of the own cell input from the measurement manager 413 is the value measured on the basis of the measurement resource restriction, the MDT report generator 419 generates the logged measurement report in which the measurement resource restriction flag is set to the true. The measurement resource restriction flag may be configured by 1 bit.

The transmitter 405 transmits the response message to the individual control information, the RRC connection request message, the RRC connection setup complete message, or the terminal information response message including the logged measurement report.

Configuration of Base Station According to Fourth Embodiment

Figure 18:
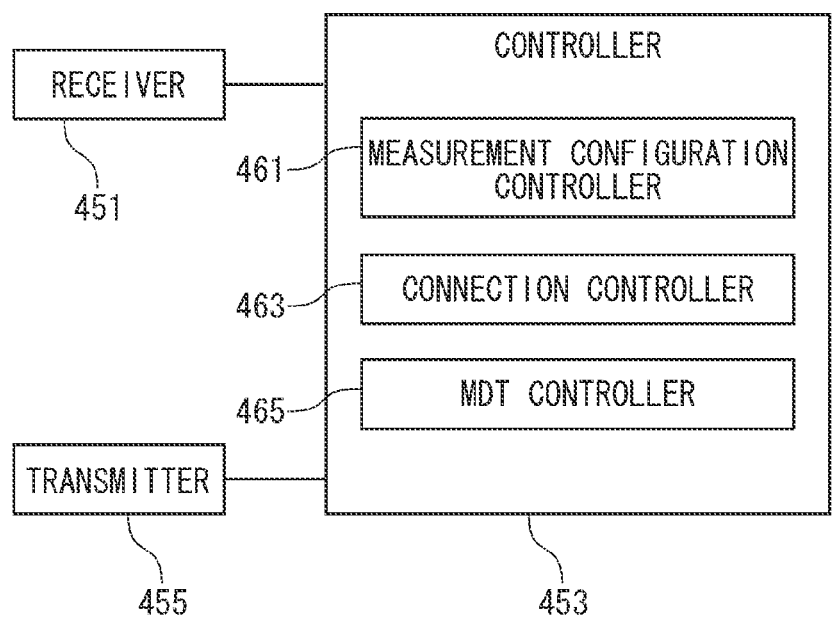
FIG. 18 is a block diagram of the base station configuring the wireless communication system according to the fourth embodiment.

FIG. 18 is a block diagram of the base station configuring the wireless communication system according to the fourth embodiment. As illustrated in FIG. 18, the base station according to the fourth embodiment includes a receiver 451, a controller 453, and a transmitter 455. The controller 453 includes a measurement configuration controller 461, a connection controller 463, and an MDT controller 465.

The receiver 451 receives the RRC connection request message, the RRC connection setup complete message, or the terminal information response message which have been transmitted from the terminal, and output the message to the controller 453.

When the controller 453 determines that the terminal performs the measurement of the own cell in the specific resource, the controller 453 generates the system information including the measurement resource restriction for the own cell. The controller 453 generates the system information including the configuration for cell selection or cell reselection, which has been input from the measurement configuration controller 461. The controller 453 instructs the transmitter 455 to transmit the system information. When the controller 453 receives the RRC connection request message, the controller 453 outputs the message to the connection controller 463. If the logged measurement available flag is included in the RRC connection setup complete message, and set to the true (true), the controller 453 outputs that the terminal holds the logged measurement result to the MDT controller 465. The controller 453 outputs the input logged measurement result to the MDT controller 465.

The measurement configuration controller 461 of the controller 453 generates the configuration for the cell selection or the cell reselection. The configuration for the cell selection or the cell reselection is a threshold value for starting the cell reselection within the frequency of the own cell, or a threshold value for starting the cell reselection at a frequency other than that of the own cell. The measurement configuration controller 461 outputs the configuration for the cell selection or the cell reselection to the connection controller 463.

Upon receiving the RRC connection request message, the connection controller 463 determines whether to permit the connection of the terminal that has transmitted the message, or not. When the connection controller 463 determines that the connection of the above terminal is permitted, the connection controller 463 generates the RRC connection setup message, and outputs the generated message to the transmitter 455.

Upon being notified that the terminal holds the logged measurement result, the MDT controller 465 determines whether to collect the MDT information, or not. If the MDT controller 465 determines to collect the logged measurement result of the terminal, the MDT controller 465 generates the terminal information request message (UEInformationRequest) in which the logged measurement request flag (log MeasAvailable) is set to the true (true), and outputs the generated message to the transmitter 455. Upon receiving the logged measurement report, the MDT controller 465 determines whether the measurement result of the own cell included in the above report is the value measured by the measurement resource restriction, or not. In the determination method, if the terminal includes the measurement resource restriction flag, the determination is performed according to the flag. The measurement resource restriction information may be shared within the network to perform the determination. The MDT controller 465 optimizes the network on the basis of the MDT report. The MDT controller 465 may share the logged measurement report within the network to optimize the network.

The transmitter 455 transmits the individual control information, the system information, the RRC connection setup message, or the terminal information request message to the terminal.

Subsequently, the operation of the terminal according to the fourth embodiment will be described. FIGS. 19 and 20 are flowcharts illustrating an example of the operation of the terminal according to the fourth embodiment.

The terminal receives the logged measurement configuration (Logged measurement configuration) by the individual control information in a connected state (Step S401). Then, the terminal transitions from the connected state to the idle state (Step S402).

The terminal selects a cell belonging to the idle state (Camp On) (Step S403). If the terminal does not hold the latest system information of the own cell, the terminal receives the system information from the own cell, and determines whether the measurement resource restriction for the own cell is included in the system information, or not (Step S404). If the measurement resource restriction for the own cell is not included in the system information (no), the terminal allows the operation to proceed to Step S405. On the other hand, if the measurement resource restriction for the own cell is included in the system information (yes), the terminal allows the operation to proceed to Step S406.

In Step S405, the terminal measures the own cell without the use of the measurement resource restriction, and allows the operation to proceed to Step S407. In Step S407, the terminal measures the own cell in the resource of the measurement resource restriction, and allows the operation to proceed to Step S407.

In Step S407, if the measurement result of the own cell satisfies a start reference of the cell selection or the cell reselection, the terminal starts to measure the neighbor cell according to the configuration of the cell selection or the cell reselection. The terminal periodically logs the measurement result on the basis of the logged measurement configuration (Step S408). The measurement result of the own cell compared with the start reference of the cell reselection uses the value of the own cell measured with the use of the measurement resource restriction if the own cell is measured by the resource of the measurement resource restriction, and uses the value of the own cell measured without the use of the measurement resource restriction if the own cell is not measured by the resource of the measurement resource restriction. The measurement result of the own cell compared with the start reference of the cell reselection may be always the value obtained by measuring the own cell without the use of the measurement resource restriction. With the above configuration, the start reference of the cell reselection can be unified between the terminal that cannot understand the measurement resource restriction and the terminal that can understand the measurement resource restriction.

After Step S408, the terminal allows the operation return to Step S403, the terminal determines the cell reselection on the basis of the measurement result of the own cell and the neighbor cell (Step S403). Also, if the transition to the connected state is triggered after logging the measurement result in Step S408 (Step S409), the terminal determines whether to hold the logged measurement result, or not (Step S410). If the terminal does not hold the logged measurement result (no), the terminal is connected to the base station without setting the logged measurement available flag (Step S411). On the other hand, if the terminal holds the logged measurement result (yes), the terminal sets the logged measurement available flag to the true (true), and transmits the above logged measurement available flag at the time of transmission (Step S412). Then, if the terminal receives the logged measurement request flag (Step 413), the terminal determines whether to hold the value measured in the resource of the measurement resource restriction, or not (Step S414). If the terminal holds the value measured in the resource of the measurement resource restriction (yes), the operation proceeds to Step S415. If the terminal does not hold the value measured in the resource of the measurement resource restriction (no), the operation proceeds to Step S416.

In Step S415, the terminal generates the logged measurement report in which the measurement resource restriction flag is set to the true, in the value obtained by measuring the own cell in the resource of the measurement resource restriction. The measurement resource restriction flag may be configured by 1 bit. On the other hand, in Step S416, the terminal generates the logged measurement report by the value measured without the use of the measurement resource restriction. After Steps 415 and S416, the operation proceeds to Step S417. In Step S417, the terminal transmits the logged measurement report generated in Step S415 or S416 to the base station.

As described above, according to this embodiment, the terminal includes the value of the own cell measured with the use of the measurement resource restriction in the logged measurement report. For that reason, the base station that has received the logged measurement report can precisely grasp the state of the cell in the terminal even under the environment where the ABS is used. In particular, if the terminal is located in the vicinity of the CSG cell not permitted to be accessed, to measure the cell permitted to be accessed is more important because a connectivity of the terminal with the cell can be enhanced. With the use of this embodiment, the terminal can enhance the connectivity with the own cell, and can enhance the connectivity of the terminal with the cell. Also, if the terminal is connected to the cell having the cell coverage expanded more than that of the conventional art, the own cell is measured with the use of the ABS of the neighbor cell, thereby being capable of precisely measuring the state of the cell to which the network is to maintain the connection.

Another Example 1

In the above fourth embodiment, a case in which the measurement resource restriction for the own cell is included in the system information of the own cell has been described. Instead, the measurement resource restriction for the neighbor cell may be included. That is, if the measurement resource restriction for the neighbor cell is included in the system information for the own cell, the terminal logs the value obtained by measuring the neighbor cell by the resource of the measurement resource restriction, and includes the logged value in the logged measurement report. The terminal sets the measurement resource restriction flag to the true for each of the cells in the value measured by the resource of the measurement resource restriction. The measurement resource restriction flag may be provided for not each cell but each frequency. The measurement resource restriction for the neighbor cell may be applied to only the specific neighbor cell by being informed of together with the neighbor cell list. In this case, the measurement resource restriction flag is set for each of the cells. The terminal logs the value measured without the use of the measurement resource restriction for the cell having no measurement resource restriction, and includes that value in the logged measurement report. With this configuration, in the case where the cell coverage of the terminal is expanded more than that of the conventional art for the operation, because the neighbor cell can be measured taking the ABS into consideration, the network can precisely collect the information of the cell when the ABS is applied.

Another Example 2

In the above fourth embodiment, the case in which the measurement resource restriction for the own cell is included in the system information of the own cell has been described. Instead, both of the measurement resource restriction for the own cell and the measurement resource restriction for the neighbor cell may be included in the system information of the own cell. That is, if the both of the measurement resource restrictions are included in the system information of the own cell, the terminal logs the value obtained by measuring the own cell by the resource of the measurement resource restriction for the own cell, logs the value obtained by measuring the neighbor cell by the resource of the measurement resource restriction for the neighbor cell, and includes those values in the logged measurement report. The terminal may configure the measurement resource restriction for the own cell and the measurement resource restriction for the neighbor cell at the same time. With the above configuration, in the case where the cell coverage of the terminal is to be expanded more than that of the conventional art for the operation, because the neighbor cell can be measured taking the ABS into consideration, the network can precisely collect the information of the cell when the ABS is applied.

Another Example 3

In the above fourth embodiment, the case in which the measurement resource restriction for the own cell is included in the system information of the own cell has been described. Instead, the measurement resource restriction included in the system information of the own cell may be applied to both of the own cell and the neighbor cell on the same frequency. That is, the terminal logs the values obtained by measuring the own cell and the neighbor cell with the use of the measurement resource restriction included in the system information of the own cell, and includes the respective values in the logged measurement report. With the above configuration, the terminal can grasp the states of the own cell and the neighbor cell at the same timing. The terminal logs the value measured without the use of the measurement resource restriction for the cell having no measurement resource restriction, and includes that value in the logged measurement report. With the above configuration, in the case where the cell coverage of the terminal is to be expanded more than that of the conventional art for the operation, because the neighbor cell can be measured taking the ABS into consideration, the network can precisely collect the information of the cell when the ABS is applied.

Another Example 4

In the above fourth embodiment, the case in which the measurement resource restriction for the own cell is included in the system information of the own cell has been described. Instead, the ABS information of the own cell may be included. In this case, the terminal logs the value obtained by measuring the neighbor cell with the use of the ABS of the own cell, and includes that value in the logged measurement report. If the ABS information of the own cell is not included in the system information of the own cell, the terminal logs the value obtained by measuring the neighbor cell without the use of the measurement resource restriction, and includes that value in the measurement result report. The terminal logs the value obtained by measuring the own cell without the use of the measurement resource restriction, and includes the logged value in the measurement result report. Further, the terminal sets a flag indicative of the measurement taking the ABS into consideration (measurement resource restriction flag) to the true, for the neighbor cell measured with the use of the ABS of the own cell.

In the above fourth embodiment, the case in which the measurement resource restriction for the own cell is included in the system information of the own cell has been described. Instead, the cell list and the ABS information for each cell may be included. In this case, the terminal calculates the resource (measurement resource restriction) in which the interference is reduced for each of the cells from the cell list and the ABS information of each cell, measures the own cell and the neighbor cell with the use of that resource, and includes the respective measured values in the logged measurement report. The terminal logs the value measured without the use of the measurement resource restriction for the cell determined to be measured without the use of the measurement resource restriction, and includes the logged value in the logged measurement report. In this case, the terminal sets the measurement resource restriction flag to the true for the cell measured with the use of the measurement resource restriction. Only the own cell may be measured with the use of the measurement resource restriction.

In the above fourth embodiment, and the other examples 1 to 4, a flag (measurement resource restriction consideration flag) of whether the measurement resource restriction is taken into consideration, or not, may be included in the logged measurement configuration (Logged Measurement Configuration). The measurement resource restriction consideration flag is configured by 1 bit. If the measurement resource restriction consideration flag is set to the true (true), the terminal performs the operation of the fourth embodiment. On the other hand, if the measurement resource restriction consideration flag is not set, the terminal always logs the value obtained by measuring the own cell without the use of the measurement resource restriction. With the above configuration, in the case where the terminal that is in the idle state measures the own cell with the use of the measurement resource restriction while the terminal measures the own cell without the use of the measurement resource restriction, the terminal can designate which of the values is to be included in the logged measurement result, and can precisely acquire the information to be known by the network.

In the case where the terminal measures the own cell with the use of the measurement resource restriction while the terminal measures the own cell without the use of the measurement resource restriction, the measurement result of the own cell compared with the start reference of the cell reselection may be always a value obtained by measuring the own cell without the use of the measurement resource restriction. With the above operation, the start reference of the cell reselection can be unified between the terminal that cannot understand the measurement resource restriction and the terminal that can understand the measurement resource restriction.

In the above fourth embodiment, the terminal receives the system information from only the own cell. Alternatively, the terminal may receive the respective system information from the own cell and the neighbor cell. In this situation, the terminal acquires the ABS information from the system information of the respective cells, calculates the resource (measurement resource restriction) in which the interference is reduced for each of the cells, logs the respective values obtained by measuring the own cell and the neighbor cell with the use of the resource, and includes the respective values in the measurement result report. In this situation, the terminal sets the measurement resource restriction flag to the true for the cell measured with the use of the measurement resource restriction. The terminal may measure only the own cell with the use of the measurement resource restriction. In the cell determined to be measured without the use of the measurement resource restriction, the terminal logs the value measured without the use of the measurement resource restriction, and includes the logged value in the logged measurement report.

The measurement resource restriction consideration flag described above may be configured by 2 bits. The measurement resource restriction consideration flag represented by 2 bits can express, for example, the following three patterns.
 00: The ABS is not taken into consideration.
 01: The ABS information is received from only the own cell.
 10: The ABS information is received from the own cell and the neighbor cell.

If the measurement resource restriction consideration flag included in the logged measurement configuration is "00", the terminal logs the values obtained by measuring the own cell and the neighbor cell without the use of the measurement resource restriction, and includes those values in the logged measurement report. Also, if the measurement resource restriction consideration flag included in the logged measurement configuration is "01", the terminal attempts to receive the ABS information from only the own cell, and if the ABS information is included, the terminal logs the value obtained by measuring the neighbor cell by the resource of the ABS of the own cell, and includes the value in the measurement result report. Also, if the measurement resource restriction consideration flag included in the logged measurement configuration is "10", the terminal attempts to receive the ABS information from the own cell and the neighbor cell, and if the ABS information is included, the terminal calculates the measurement resource for each of the cells, and includes the values measured with the use of the measurement resource restriction for the cells determined to be subjected to the measurement resource restriction in the logged measurement report. With the above operation, the base station can obtain only the necessary information.

In the fourth embodiment, the case in which the measurement of the own cell is performed with the use of the measurement resource restriction included in the system information of the own cell has been described. Instead, the cell of the frequency (Inter-frequency) different from that of the own cell may be measured with the use of the measurement resource restriction included in the system information of the own cell. That is, if the measurement resource restriction is included in the system information of the own cell, the terminal logs the respective values obtained by measuring the own cell, the neighbor cell, and the neighbor cell of the frequency different from that of the own cell with the use of the measurement resource restriction included in the system information of the own cell, and includes the respective values in the logged measurement report. On the other hand, if the measurement resource restriction is not included in the system information of the own cell, the terminal logs the respective values obtained by measuring the respective cells without the use of the measurement resource restriction, and includes the respective values in the logged measurement report. In this case, the terminal sets the measurement resource restriction flag to the true (true) for the cells measured with the use of the measurement resource restriction.

In the fourth embodiment, the case in which the measurement of the own cell is performed with the use of the measurement resource restriction included in the system information of the own cell has been described. Instead, the terminal may include the ABS information of the own cell in the system information of the own cell, and measure the cell of the frequency (Inter-frequency) different from that of the own cell on the basis of the ABS information of the own cell. That is, if the ABS information of the own cell is included in the system information of the own cell, the terminal logs the respective values obtained by measuring the own cell, the neighbor cell, and the neighbor cell of the frequency different from that of the own cell with the use of the ABS of the own cell, and includes the respective values in the logged measurement result report. On the other hand, if the ABS information of the own cell is not included in the system information of the own cell, the terminal logs the respective values obtained by measuring the respective cells without the use of the measurement resource restriction, and includes the respective values in the logged measurement report. In this case, when the same ABS is used between the frequencies, even if the system information is not acquired at another frequency, the ABS of the different frequency can be taken into consideration.

In the above fourth embodiment, and the other examples 1 to 4, a flag (different frequency consideration flag) taking the frequency different from that of the own cell into consideration may be included in the logged measurement configuration (Logged Measurement Configuration). If the different frequency consideration flag is set to the true (true), the terminal logs the value obtained by measuring the neighbor cell of the frequency different from that of the own cell with the use of the ABS information of the own cell included in the system information of the own cell, and includes the value in the logged measurement report. On the other hand, if the different frequency consideration flag is not set to the true, the terminal logs the value measured without the use of the measurement resource restriction for the neighbor cell of the frequency different from that of the own cell, and includes the value in the logged measurement report. With the above configuration, because the ABS is taken into consideration only when the network wants the consideration of the ABS for the different frequency, the power consumption can be reduced.

In the above fourth embodiment, the case in which the measurement of the own cell is performed with the use of the measurement resource restriction included in the system information of the own cell has been described. In the frequency other than that of the own cell, the terminal receives the system information from the cell high in the received power, logs the respective values obtained by measuring the cell and the neighbor cell of that cell with the use of the measurement resource restriction included in the system information, and includes the respective values in the logged measurement report. The measurement resource restriction may be common at the identical frequency, or may be set in distinction between the own cell and the neighbor cell, or may be set for each of the neighbor cells by setting the measurement resource restriction for the neighbor cells together with the cell list. The frequency of the own cell can be applied with the above fourth embodiment and the other examples 1 to 4. With the above configuration, because the different frequency can be measured taking the measurement resource restriction into consideration, the network can know the state when the measurement resource restriction is applied in a plurality of frequencies.

The flag (different frequency consideration flag) taking the frequency different from that of the own cell into consideration may be included in the logged measurement configuration. If the different frequency consideration flag is set to the true (true), the terminal receives the system information from the cell high in the received power at a frequency different from that of the own cell, logs the respective values obtained by measuring the cell and the neighbor cell of that cell with the use of the measurement resource restriction included in the system information, and includes the respective values in the logged measurement report. On the other hand, if the different frequency consideration flag is not set to the true, the terminal logs the value measured without the use of the measurement resource restriction for the neighbor cell of the frequency different from that of the own cell, and includes the logged value in the logged measurement report.

In the above fourth embodiment, the case in which the measurement of the own cell is performed with the use of the measurement resource restriction included in the system information of the own cell has been described. In the frequency other than that of the own cell, the terminal receives the system information from the respective cells, logs the values obtained by measuring the respective cells, and includes the respective values in the logged measurement report. The logged measurement configuration may include the flag (different frequency consideration flag) taking the frequency different from that of the own cell into consideration. If the different frequency consideration flag is set to the true (true), the terminal receives the system information from the respective cells at the frequency different from that of the own cell, logs the value obtained by measuring the cell with the use of the measurement resource restriction included in the system information, and includes the logged value in the logged measurement report. On the other hand, if the different frequency consideration flag is not set to the true, the terminal logs the value measured without the use of the measurement resource restriction for the neighbor cell of the frequency different from that of the own cell, and includes the logged value in the logged measurement report. The frequency of the own cell can be applied with the fourth embodiment and the other examples 1 to 4.

In the above fourth embodiment, the case in which the measurement of the own cell is performed with the use of the measurement resource restriction included in the system information of the own cell has been described. In the frequency other than that of the own cell, the terminal receives the system information from the cell high in the received power, logs the respective values obtained by measuring the cell and the neighbor cell of that cell with the use of the ABS information of the above cells included in the system information, and includes the respective values in the logged measurement report. The system information may include the cell list and the ABS information of the respective cells. In this case, the terminal calculates the resource in which the interference is reduced for each of the cells, logs the value measured with the use of that resource, and includes the logged value in the logged measurement report. The frequency of the own cell can be applied with the above fourth embodiment and the other examples 1 to 4.

The flag (different frequency consideration flag) taking the frequency different from that of the own cell into consideration may be included in the logged measurement configuration. If the different frequency consideration flag is set to the true (true), the terminal receives the system information from the cell high in the received power at a frequency different from that of the own cell, logs the respective values obtained by measuring the cell and the neighbor cell of that cell with the use of the ABS information included in the system information, and includes the respective values in the logged measurement report. On the other hand, if the different frequency consideration flag is not set to the true, the terminal logs the value measured without the use of the measurement resource restriction for the neighbor cell of the frequency different from that of the own cell, and includes the logged value in the logged measurement report. With the above configuration, because the ABS is taken into consideration only when the network wants the consideration of the ABS for the different frequency, the power consumption can be reduced.

The above first to third embodiments can be used in combination. For example, when the second embodiment and the third embodiment are used in combination, when the terminal configures the measurement resource restriction of the own cell, and when the operation of the third embodiment is performed, and the terminal does not configure the measurement resource restriction of the own cell, the operation of the second embodiment is performed. With this configuration, the RLF report corresponding to the topology of the network can be performed.

In the present invention, the reason that the measurement resource restriction is used for the measurement of the RSRP is because when the measurement precision of the reference signal is degraded by the influence of an interference power, the reference signal is measured with the low interference power, to thereby enhance the precision of the RSRP. On the other hand, the reason that the measurement resource restriction is used for measurement of the RSRQ is because there is a difference in the interference power between the ABS and the resource other than the ABS, and therefore the terminal measures the RSRQ in the resource actually used. For that reason, in the above respective embodiments, only the RSRQ may be measured with the use of the measurement resource restriction, or only the RSRP may be measured with the use of the measurement resource restriction. With the above configuration, the measurement can be performed taking the environment into consideration while leaving the degree of freedom of the measurement. In this case, the measurement resource restriction may be configured for only the RSRQ or only the RSRP in advance. Also, in the measurement configuration, a target of the measurement resource restriction may be instructed by a flag of 1 bit. For example, the measurement resource restriction is intended for both of the RSRP and the RSRQ if there is no instruction, and the measurement resource restriction is intended for only the RSRQ if there is the instruction. Also, in the measurement configuration, the target of the measurement resource restriction may be instructed by a flag of 2 bits. For example, the measurement resource restriction is intended for only the RSRP, only the RSRQ, or both of the RSRP and the RSRQ according to the instruction. With the above configuration, because the target of the measurement resource restriction can be changed according to the environment, the measurement can be efficiently performed. Also, in the transmission of the RLF report request to the terminal from the base station, the RLF report taking the measurement resource restriction into consideration may be transmitted according to the instruction. With the above configuration, the base station can obtain the necessary information. The instruction method may indicate whether to transmit the value measured with the use of the measurement resource restriction, or not, for example, by using the flag. Also, an instruction may be performed to transmit the value obtained by measuring only the RSRQ with the use of the measurement resource restriction, for example, by the flag (1 bit). Also, an instruction may be performed to preferentially transmit the value obtained by measuring only the RSRQ, only the RSRP, or both of the RSRP and the RSRQ with the use of the measurement resource restriction, for example, by the flag (2 bits). Also, an instruction may be performed to include both of the measured value using the measurement resource restriction and the measured value using no measurement resource restriction in the RLF report by the RLF report request. For example, if there is the instruction, only the measured value of the measurement resource restriction is included in the RLF report, and if there is no instruction, both the measured values are included in the RLF report.

The present invention can be also applied to a carrier aggregation (Carrier Aggregation: CA). In the carrier aggregation, the terminal has a plurality of own cells, which includes one primary cell (Primary Cell: PCell) and one or more secondary cells (Secondary Cell: SCell). The primary cell is one of the own cells, which is a cell of the frequency used at the time of first connection establishment or connection reestablishment, or a cell instructed at the time of handover. On the other hand, the secondary cell is one of the own cells which is a cell configured by the wireless communication device. For example, the terminal includes the measured value of the primary cell in which the present invention is applied to the RLF report. The RLF of the terminal is determined according to the state of the primary cell, as a result of which the base station can grasp the state of the most important primary cell. Also, for example, the terminal may include the measured value of the primary cell in which the present invention is applied to the RLF report, and the measured value of the secondary cell that detects the RLF. With this configuration, the base station can grasp the state in which the RLF occurs. Also, for example, the terminal includes the measured value of the primary cell which is applied with the present invention, and the measured value of the secondary cell which is applied with the present invention, in the RLF report. As a result, the base station can grasp the states of all the own cells used by the terminal. Also, the terminal may include the measured value that is not applied with the present invention for the own cell having no value which is applied with the present invention. As a result, the base station can grasp the states of the own cells that have been used by the terminal.

If the terminal performs the carrier aggregation at the time of the RLF, the terminal may include the information (a cell global identity (Cell Global Identity: CGI), or the frequency and a physical cell identity (Physical Cell Identity: PCT)) on the secondary cell configured at the time of generating the RLF. Because the base station that has received the above RLF report can explicitly grasp which is the secondary cell configured in the terminal, the base station can more precisely grasp the state of the terminal when the radio link failure (RLF) is generated.

The present invention can be also applied to an MDT (Minimization Drive Test) function.

In the above embodiments, the method using the CRS is described, but the present invention may use a method using the reference signal other than the CRS. For example, the CRS may be replaced with the reference signal specific to the CSI-RS or the terminal.

The present invention is also useful to a case having a feature in which a specific subframe is different from another subframe.

In the above respective embodiments, the example in which the present invention is configured by hardware has been described. The present invention can be realized by software in association with the hardware.

Also, the respective functional blocks used in the description of the respective embodiments are realized as an LSI that is typically an integrated circuit. Each of those functional blocks may be configured by one chip, or a part or all of those functional blocks may be integrated into one chip. In this example, the chip is called the LSI, but may be called IC, system LSI, super LSI, or ultra LSI due to a difference in integration.

Also, a technique of the integrated circuit is not limited to the LSI, but may be realized by a dedicated circuit or a general-purpose processor. There may be used an FPGA (field programmable gate array) that is programmable after manufacturing an LSI, or a reconfigurable processor that can reconfigure the connection or setting of a circuit cell within the LSI.

Further, if a technology for integration circuit which is substituted for the LSI appears due to the development of the semiconductor technology or another technology derived therefrom, the functional blocks may be integrated by that technology. A biotechnology may be applied.

The above embodiments have been described as the antenna, however, the same is applicable even to an antenna port. The antenna port (Antenna port) means a logical antenna configured by one or plural physical antennas. That is, the antenna port does not always mean one physical antenna, but may mean an array antenna configured by plural antennas. For example, in the LTE (Long Term Evolution), the number of physical antennas configuring the antenna port is not specified, but the antenna port is specified as the minimum unit by which the base station can transmit different reference signals (Reference signal). Also, the antenna port may be specified as the minimum unit by which the weighting of a precoding vector (Precoding vector) is multiplied.

The present invention has been described in detail and with reference to the specific embodiments, but one skilled in the art could devise variations without departing from the spirit and scope of the invention disclosed therein.

The present application is based on Japanese Patent Application No. 2011-030036 filed on Feb. 15, 2011, and Japanese Patent Application No. 2011-082183 filed on Apr. 1, 2011, the contents of which are incorporated herein by reference.

INDUSTRIAL APPLICABILITY

The wireless communication terminal, the wireless communication base station, and the wireless communication system according to the present invention are useful as the wireless communication system that reduces the traffic volume to be transmitted to the wireless communication terminal, or reduces the transmission power of the wireless signal, as well as the wireless communication terminal and the wireless communication base station which are used in the wireless communication system.

REFERENCE SIGNS LIST

101, 201, 301, 401: receiver
103, 203, 303, 403: controller 105, 405: transmitter
111, 211, 311, 411: measurement configuration manager
113, 213, 313, 413: measurement manager
115: RLM controller
117: reconnection controller
417: connection controller
119, 219, 319: RLF report generator
419: MDT report generator
121: RLF report manager
421: MDT report manager
131, 431: own cell measurement section
133, 433: restricted own cell measurement section
135, 235, 335, 435: neighbor cell measurement section
237, 337: restricted neighbor cell measurement section
151, 451: receiver
153, 253, 453: controller
155, 455: transmitter
161, 261, 461: measurement configuration controller
163: reconnection controller
463: connection controller
165, 265: RLF controller
465: MDT controller

The invention claimed is:

1. An integrated circuit for controlling a communication apparatus, the integrated circuit comprising:
   control circuitry, which, in operation,
      configures carrier aggregation (CA) of communication cells which include a primary cell (PCell) and at least one secondary cell (SCell), and
      generates control information including an instruction to restrict measurement of the PCell to a portion of radio resources of the PCell;
   transmission circuitry, which is coupled to the control circuitry and which, in operation, transmits the generated control information to a wireless communication terminal, wherein the wireless communication terminal is configured to generates a radio link failure report including a measurement result of the portion of the radio resources of the PCell when a radio link failure occurs in the PCell; and
   reception circuitry, which is coupled to the control circuitry and which, in operation, receives the radio link failure report from the wireless communication terminal.

2. The integrated circuit according to claim 1, wherein the portion of the radio resources of the PCell includes a subframe, in which no downlink signals are transmitted or downlink signals are transmitted at a reduced transmission power in the PCell.

3. The integrated circuit according to claim 1, wherein the portion of the radio resources of the PCell includes a subframe, in which no downlink signals are transmitted or downlink signals are transmitted at a low transmission power in a neighboring cell.

4. The integrated circuit according to claim 1, wherein the portion of the radio resources of the PCell includes a subframe, in which no downlink signals are transmitted or downlink signals are transmitted at a low transmission power in the at least one SCell.

5. The integrated circuit according to claim 1, wherein when the transmitted control information includes the instruction to restrict the measurement of the PCell to the portion of the radio resources of the PCell, the radio link failure report includes a measurement result of resources of a neighboring cell corresponding to the portion of the radio resources of the PCell.

6. The integrated circuit according to claim 1, wherein the controlled communication apparatus is a wireless base station.

* * * * *